US012452884B2

(12) United States Patent
Panzner et al.

(10) Patent No.: US 12,452,884 B2
(45) Date of Patent: Oct. 21, 2025

(54) SIDELINK CONNECTION ESTABLISHMENT ASSISTANCE

(71) Applicant: NOKIA TECHNOLOGIES OY, Espoo (FI)

(72) Inventors: Berthold Panzner, Holzkirchen (DE); Jakob Lindbjerg Buthler, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 432 days.

(21) Appl. No.: 17/996,612

(22) PCT Filed: Apr. 20, 2020

(86) PCT No.: PCT/EP2020/061003
§ 371 (c)(1),
(2) Date: Oct. 19, 2022

(87) PCT Pub. No.: WO2021/213615
PCT Pub. Date: Oct. 28, 2021

(65) Prior Publication Data

US 2023/0300855 A1 Sep. 21, 2023

(51) Int. Cl.
*H04W 72/25* (2023.01)
*H04W 88/06* (2009.01)

(52) U.S. Cl.
CPC ............ *H04W 72/25* (2023.01); *H04W 88/06* (2013.01)

(58) Field of Classification Search
CPC ....... H04W 72/25; H04W 88/06; H04W 4/40; H04W 76/14
See application file for complete search history.

(56) References Cited

U.S. PATENT DOCUMENTS 8,923,134 B2 * 12/2014 Meredith .............. H04W 16/18 370/252
11,206,517 B2 * 12/2021 Kang ...................... H04W 4/40
2018/0092067 A1 * 3/2018 Liu ........................ H04W 72/52
2019/0357025 A1 * 11/2019 Hwang .................. H04W 8/24
(Continued)

FOREIGN PATENT DOCUMENTS

EP 3737198 A1 11/2020

OTHER PUBLICATIONS

3GPP TSG-RAN WG2 Meeting #109 electronic; Feb. 24-Mar. 6, 2020 ; Agenda Item: 6.4.2.2; Source: OPPO; Title: Left issues on SL capability; Document for: Discussion, Decision (Year: 2020).*
(Continued)

*Primary Examiner* — Nizam U Ahmed
(74) *Attorney, Agent, or Firm* — Brake Hughes Bellermann LLP

(57) ABSTRACT

There are provided measures for improvement of sidelink connection establishment assistance. Receiving (S61), from a first terminal, a request for a sidelink connection between said first terminal and a second terminal, obtaining (S62) first sidelink related terminal capabilities of said first terminal and second sidelink related terminal capabilities of said second terminal, generating (S63) an intersection set of said first sidelink related terminal capabilities and said second sidelink related terminal capabilities, and setting (S64) a configuration for said sidelink connection based on said intersection set.

15 Claims, 21 Drawing Sheets

(56) References Cited

U.S. PATENT DOCUMENTS

2020/0037132 A1 1/2020 Wu et al.
2023/0337299 A1* 10/2023 Zhang .................... H04L 45/66

OTHER PUBLICATIONS

International Search Report and Written Opinion for International Application No. PCT/EP2020/061003, mailed Jan. 29, 2021, 15 pages.
3GPP TS 36.331, V16.0.0; 3rd Generation Partnership Project; Technical Specification Group Radio Access Network; Evolved Universal Terrestrial Radio Access (E-UTRA); Radio Resource Control (RRC); Protocol specification (Release 16), vol. RAN WG2, Apr. 6, 2020; 1049 pages.
3GPP TSG-RAN WG2 Meeting #109 electronic; R2-2000193; "Left issues on SL capability"; Agenda Item: 6.4.2.2; Source: OPPO; Mar. 6, 2020; 4 pages.
3GPP TSG-RAN WG2 Meeting #109 electronic; R2-2001418; "Remaining issue on sidelink AS configuration"; Agenda Item: 6.4.2.2; Source: Huawei, HiSilicon; Mar. 6, 2020; 3 pages.
3GPP TSG-RAN WG2 #109b-e; R2-2002638; "Summary of [Post109e#20][V2X] Remaining UE capability issues (OPPO)"; 6.4.2.2; Source: OPPO; E-meeting, Apr. 2020; 17 pages.

* cited by examiner

SIDELINK CONNECTION ESTABLISHMENT ASSISTANCE

CROSS-REFERENCE TO RELATED APPLICATIONS

This application is a national stage entry of International Application No. PCT/EP2020/061003, filed Apr. 20, 2020, entitled "IMPROVEMENT OF SIDELINK CONNECTION ESTABLISHMENT ASSISTANCE" which is hereby incorporated by reference in its entirety.

FIELD

The present invention relates to improvement of sidelink connection establishment assistance. More specifically, the present invention exemplarily relates to measures (including methods, apparatuses and computer program products) for realizing improvement of sidelink connection establishment assistance.

BACKGROUND

The present specification generally relates to device-to-device (D2D) communication over the Third Generation Partnership Project (3GPP) PC5 interface and resolves the collision of different user equipment (UE) capabilities of two UEs attempting a unicast sidelink connection.

FIG. 10 shows a schematic diagram of an example of a system environment with signaling variants. In particular, FIG. 10 illustrates a unicast sidelink configuration procedure with an Access Stratum (AS) configuration failure due to different UE capabilities at the transmitting (TX) UE (initiating UE) and the receiving (RX) UE (peer UE).

In FIG. 10, the initiating UE (TX UE) is assumed to be in RRC_CONNECTED mode and wants to communicate with its peer UE (RX UE) in unicast sidelink. Since, according to this example, the TX UE is using sidelink in mode 1 (mode 1 for new radio (NR), mode 3 in long term evolution sidelink (LTE-SL)), the TX UE is requesting PC5 configuration and PC5 resource allocation for the sidelink from its gNB by reporting its own UE capabilities.

A problem occurs if the TX UE and the RX UE have different UE capabilities.

As an example, the parameter 15-10 (Feature "15", Index "15-10", Feature Group "256 QAM sidelink transmission", Component "1) UE can transmit PSSCH with 256 QAM in NR sidelink") from section 15 "5G_V2X_NRSL" in 3GPP RAN1 "R1-1911751: RAN1 UE features list for Rel-16 NR" is considered, and it is assumed that the TX UE supports the feature (TX UE is 256 QAM capable) and the RX UE does not support the feature (RX UE is not 256 QAM capable).

When the initiating UE (TX UE) reports its UE capability, the resulting PC5 configuration received from the network (assuming 256 QAM capability) cannot be fulfilled by the RX UE. As a result of this misconfiguration, as shown in FIG. 10, the RX UE feedbacks an AS configuration failure.

It is presently foreseen that the AS configuration failure message does not indicate the root cause of the failure. In particular, it is presently foreseen that the radio resource control (RRC) connected TX UE reports a new failure cause to the network (NW) upon the reception of RRCReconfigurationFailureSidelink from the RX UE. In case an AS configuration failure message is received from the RX UE, the TX UE shall not apply the sidelink radio bearer (SLRB) configuration(s), which were included in the corresponding failed AS configuration message.

As a result, the AS configuration failure message is an empty message not giving any indication why the peer UE (RX UE) could not comply with the PC5 configuration.

Hence, neither the TX UE receiving the AS configuration failure message, nor the network receiving the RRCReconfiguration failure from its UE (TX UE) do know why the unicast PC5 connection establishment has failed. In other words, the initiating UE (TX UE) only knows that the peer UE (RX UE) cannot comply with the PC5 configuration, but not why.

A further approach was proposed, according to which the initiating UE (TX UE) shall report not its own UE capability to its gNB but rather report the peer UE's (RX UE) capabilities.

Such approach, however, leads to a similar problem, since that can result in the situation that the initiating UE (TX UE) gets a PC5 configuration from its gNB that the TX UE itself cannot comply with.

The following table illustrates the problem which may rise from such approach.

| case | TX UE supports 256QAM | RX UE supports 256 QAM |
|---|---|---|
| A | Yes | No |
| B | No | Yes |

Here, the above-mentioned parameter 15-10 (Feature "15", Index "15-10", Feature Group "256 QAM sidelink transmission", Component "1) UE can transmit PSSCH with 256 QAM in NR sidelink") from section 15 "5G_V2X_NRSL" in 3GPP RAN1 "R1-1911751: RAN1 UE features list for Rel-16 NR" is considered again.

It can easily be acknowledged that if in case B the TX UE would report the RX UE's capability (as its own capability), the TX UE would report the RX UE "256 QAM support" to the TX UE base station although the TX UE does not support 256 QAM. On the other hand, from the same table the first discussed scenario can easily be acknowledged. Namely, if in case A the TX UE would report the TX UE's capability, the TX UE would report the RX UE "256 QAM support" to the TX UE base station although the RX UE does not support 256 QAM.

Hence, the problem arises that the sidelink configuration issued by the network does not consider/fit the actual capability situation of the sidelink pair such that a sidelink connection establishment failure may occur. In some scenarios, the network does not even become aware of the actual cause of the sidelink connection establishment failure.

Hence, there is a need to provide for improvement of sidelink connection establishment assistance and in particular for prevention of UE capability mismatch and AS configuration failure in sidelink scenarios.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising receiving, from a first terminal, a request for a sidelink connection between said first terminal and a second terminal, obtaining first sidelink related terminal capabilities of said first terminal and second sidelink related terminal capabilities of said second terminal, generating an intersection set of said first sidelink related terminal capabilities and said second sidelink related terminal capabilities, and setting a configuration for said sidelink connection based on said intersection set.

According to an exemplary aspect of the present invention, there is provided a method of a first terminal attempting a sidelink connection between said first terminal and a second terminal, the method comprising receiving, from a network node serving said first terminal, an enquiry for first sidelink related terminal capabilities of said first terminal, and transmitting said first sidelink related terminal capabilities to said network node.

According to an exemplary aspect of the present invention, there is provided a method of a first terminal attempting a sidelink connection between said first terminal and a second terminal, the method comprising receiving, from a network node serving said first terminal, an enquiry for second sidelink related terminal capabilities of said second terminal, enquiring, from said second terminal, said second sidelink related terminal capabilities, receiving said second sidelink related terminal capabilities from said second terminal, and transmitting said second sidelink related terminal capabilities to said network node.

According to an exemplary aspect of the present invention, there is provided a method of a first terminal attempting a sidelink connection between said first terminal and a second terminal, the method comprising receiving, from a network node serving said first terminal, an enquiry for first sidelink related terminal capabilities of said first terminal and second sidelink related terminal capabilities of said second terminal, enquiring, from said second terminal, said second sidelink related terminal capabilities, receiving said second sidelink related terminal capabilities from said second terminal, and transmitting said first sidelink related terminal capabilities and said second sidelink related terminal capabilities to said network node.

According to an exemplary aspect of the present invention, there is provided an apparatus comprising receiving circuitry configured to receive, from a first terminal, a request for a sidelink connection between said first terminal and a second terminal, obtaining circuitry configured to obtain first sidelink related terminal capabilities of said first terminal and second sidelink related terminal capabilities of said second terminal, generating circuitry configured to generate an intersection set of said first sidelink related terminal capabilities and said second sidelink related terminal capabilities, and setting circuitry configured to set a configuration for said sidelink connection based on said intersection set.

According to an exemplary aspect of the present invention, there is provided an apparatus of a first terminal attempting a sidelink connection between said first terminal and a second terminal, the apparatus comprising receiving circuitry configured to receive, from a network node serving said first terminal, an enquiry for first sidelink related terminal capabilities of said first terminal, and transmitting circuitry configured to transmit said first sidelink related terminal capabilities to said network node.

According to an exemplary aspect of the present invention, there is provided an apparatus of a first terminal attempting a sidelink connection between said first terminal and a second terminal, the apparatus comprising receiving circuitry configured to receive, from a network node serving said first terminal, an enquiry for second sidelink related terminal capabilities of said second terminal, and enquiring circuitry configured to enquire, from said second terminal, said second sidelink related terminal capabilities, wherein said receiving circuitry is further configured to receive said second sidelink related terminal capabilities from said second terminal, and the apparatus further comprises transmitting circuitry configured to transmit said second sidelink related terminal capabilities to said network node.

According to an exemplary aspect of the present invention, there is provided an apparatus of a first terminal attempting a sidelink connection between said first terminal and a second terminal, the apparatus comprising receiving circuitry configured to receive, from a network node serving said first terminal, an enquiry for first sidelink related terminal capabilities of said first terminal and second sidelink related terminal capabilities of said second terminal, and enquiring circuitry configured to enquire, from said second terminal, said second sidelink related terminal capabilities, wherein said receiving circuitry is further configured to receive said second sidelink related terminal capabilities from said second terminal, and the apparatus further comprises transmitting circuitry configured to transmit said first sidelink related terminal capabilities and said second sidelink related terminal capabilities to said network node.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform receiving, from a first terminal, a request for a sidelink connection between said first terminal and a second terminal, obtaining first sidelink related terminal capabilities of said first terminal and second sidelink related terminal capabilities of said second terminal, generating an intersection set of said first sidelink related terminal capabilities and said second sidelink related terminal capabilities, and setting a configuration for said sidelink connection based on said intersection set.

According to an exemplary aspect of the present invention, there is provided an apparatus of a first terminal attempting a sidelink connection between said first terminal and a second terminal, the apparatus comprising at least one processor, at least one memory including computer program code, and at least one interface configured for communication with at least another apparatus, the at least one processor, with the at least one memory and the computer program code, being configured to cause the apparatus to perform receiving, from a network node serving said first terminal, an enquiry for first sidelink related terminal capabilities of said first terminal, and transmitting said first sidelink related terminal capabilities to said network node.

According to an exemplary aspect of the present invention, there is provided an apparatus of a first terminal attempting a sidelink connection between said first terminal and a second terminal, the apparatus comprising at least one processor, at least one memory including computer program code, and at least one interface configured for communication with at least another apparatus, the at least one processor, with the at least one memory and the computer program code, being configured to cause the apparatus to perform receiving, from a network node serving said first terminal, an enquiry for second sidelink related terminal capabilities of said second terminal, enquiring, from said second terminal, said second sidelink related terminal capabilities, receiving said second sidelink related terminal capabilities from said second terminal, and transmitting said second sidelink related terminal capabilities to said network node.

According to an exemplary aspect of the present invention, there is provided an apparatus of a first terminal attempting a sidelink connection between said first terminal and a second terminal, the apparatus comprising at least one processor, at least one memory including computer program code, and at least one interface configured for communication with at least another apparatus, the at least one processor, with the at least one memory and the computer program code, being configured to cause the apparatus to perform receiving, from a network node serving said first terminal, an enquiry for first sidelink related terminal capabilities of said first terminal and second sidelink related terminal capabilities of said second terminal, enquiring, from said second terminal, said second sidelink related terminal capabilities, receiving said second sidelink related terminal capabilities from said second terminal, and transmitting said first sidelink related terminal capabilities and said second sidelink related terminal capabilities to said network node.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient and targeted configuration of a unicast sidelink connection considering the capabilities of both participants to thereby solve at least part of the problems and drawbacks identified in relation to the prior art.

By way of exemplary embodiments of the present invention, there is provided improvement of sidelink connection establishment assistance. More specifically, by way of exemplary embodiments of the present invention, there are provided measures and mechanisms for realizing improvement of sidelink connection establishment assistance.

Thus, improvement is achieved by methods, apparatuses and computer program products enabling/realizing improvement of sidelink connection establishment assistance.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) improvement of sidelink connection establishment assistance.

Figure 1:
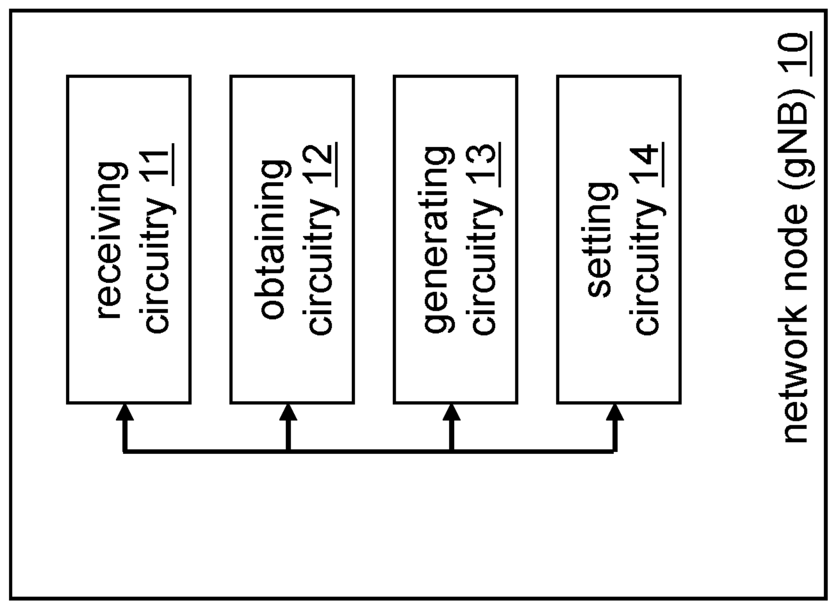
FIG. 1 is a block diagram illustrating an apparatus according to exemplary embodiments of the present invention.
Figure 6:
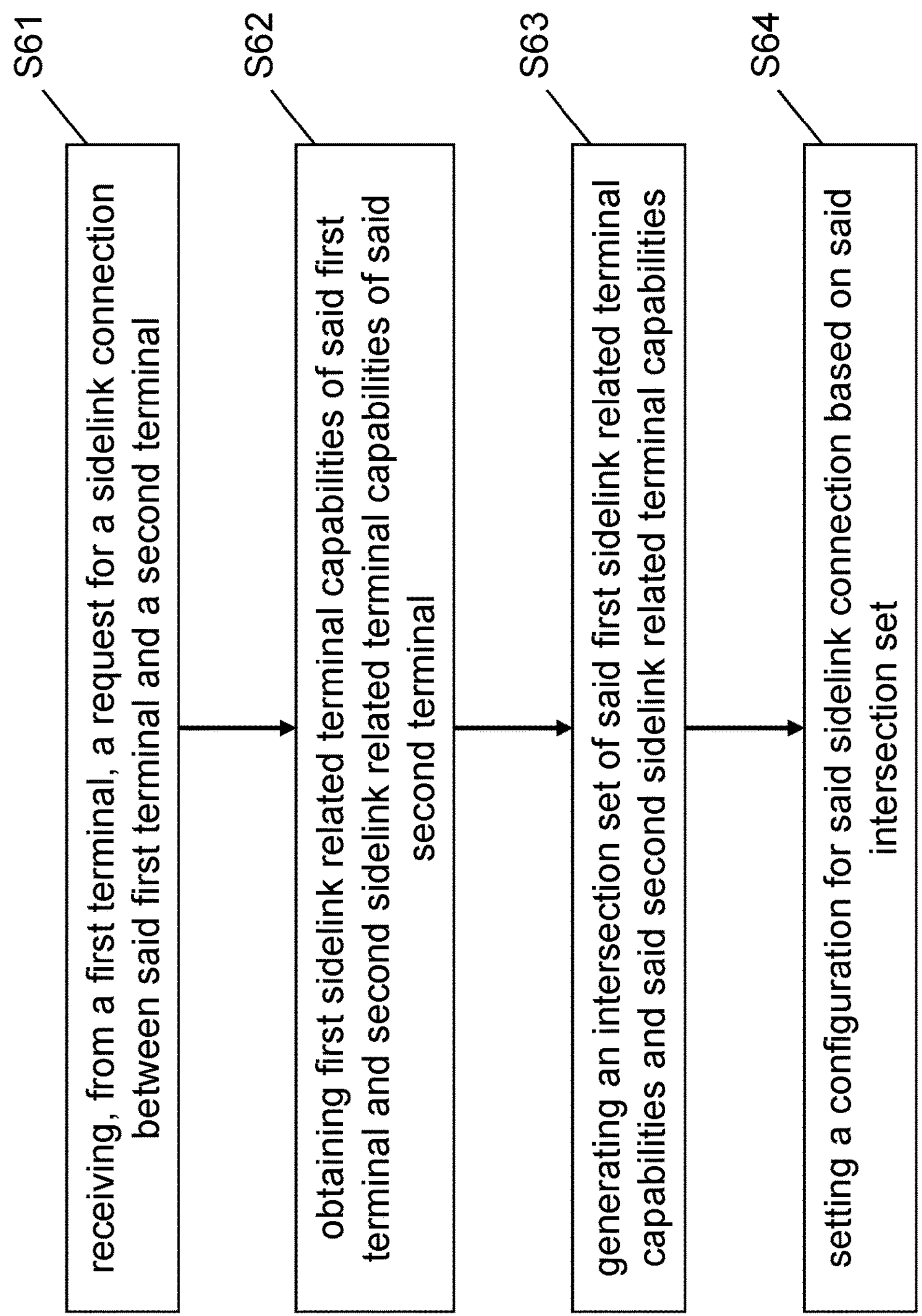
FIG. 6 is a schematic diagram of a procedure according to exemplary embodiments of the present invention.

FIG. 1 is a block diagram illustrating an apparatus according to exemplary embodiments of the present invention. The apparatus may be a network node 10 such as a base station (e.g. gNB) comprising a receiving circuitry 11, an obtaining circuitry 12, a generating circuitry 13, and a setting circuitry 14. The receiving circuitry 11 receives, from a first terminal, a request for a sidelink connection between said first terminal and a second terminal. The obtaining circuitry 12 obtains first sidelink related terminal capabilities of said first terminal and second sidelink related terminal capabilities of said second terminal. The generating circuitry 13 generates an intersection set of said first sidelink related terminal capabilities and said second sidelink related terminal capabilities. The setting circuitry 14 sets a configuration for said sidelink connection based on said intersection set. FIG. 6 is a schematic diagram of a procedure according to exemplary embodiments of the present invention. The apparatus according to FIG. 1 may perform the method of FIG. 6 but is not limited to this method. The method of FIG. 6 may be performed by the apparatus of FIG. 1 but is not limited to being performed by this apparatus.

As shown in FIG. 6, a procedure according to exemplary embodiments of the present invention comprises an operation of receiving (S61), from a first terminal, a request for a sidelink connection between said first terminal and a second terminal, an operation of obtaining (S62) first sidelink related terminal capabilities of said first terminal and second sidelink related terminal capabilities of said second terminal, an operation of generating (S63) an intersection set of said first sidelink related terminal capabilities and said second sidelink related terminal capabilities, and an operation of setting (S64) a configuration for said sidelink connection based on said intersection set.

Figure 2:
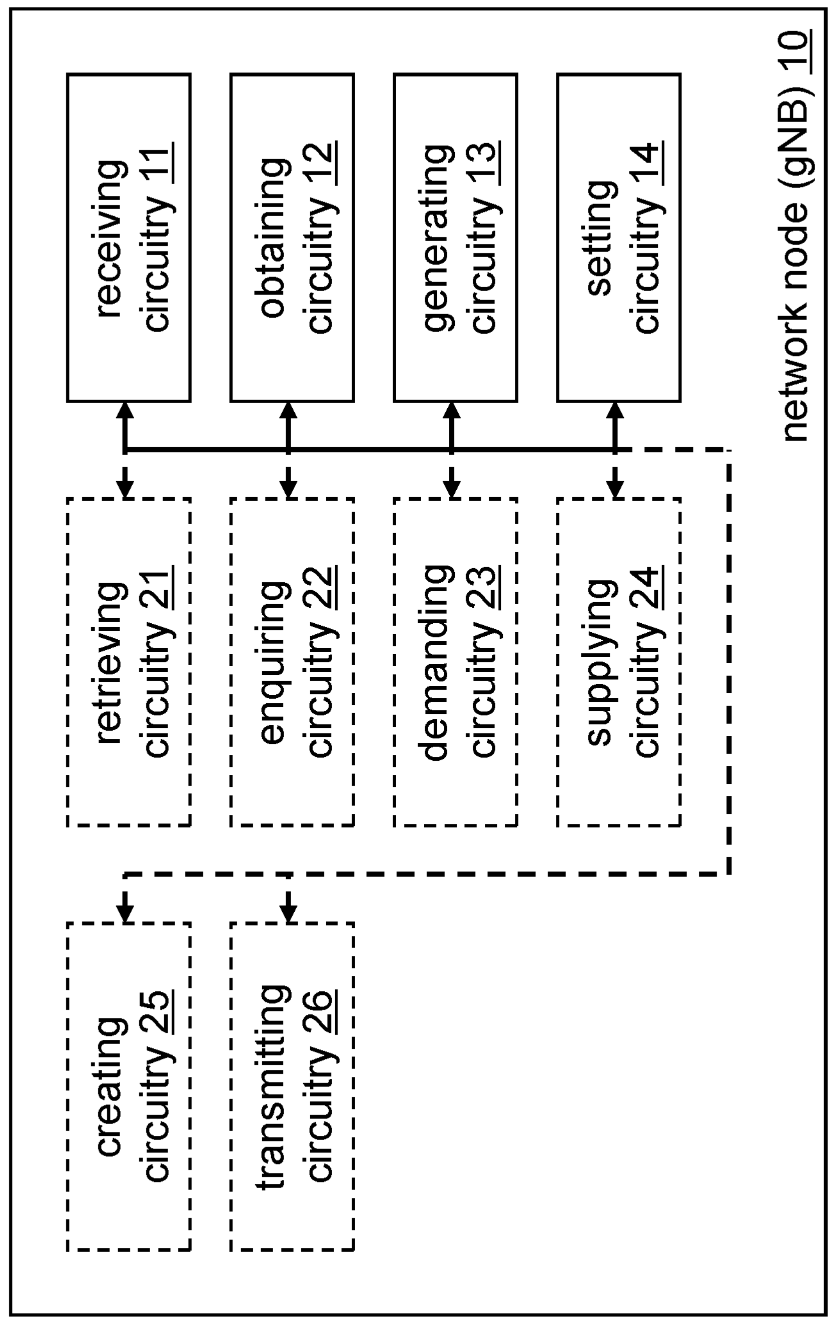
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise retrieving circuitry 21, enquiring circuitry 22, demanding circuitry 23, supplying circuitry 24, creating circuitry 25, and/or transmitting circuitry 26.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes. Such shared architecture, may comprise a remote control unit (RCU), such as a host computer or a server computer, operatively coupled (e.g. via a wireless or wired network) to a remote radio head (RRH) located in the base station or gNB, for example.

According to a variation of the procedure shown in FIG. 6, exemplary details of the obtaining operation (S62) are given, which are inherently independent from each other as such.

Such exemplary obtaining operation (S62) according to exemplary embodiments of the present invention may comprise an operation of retrieving said first sidelink related terminal capabilities from a first data set.

According to a variation of the procedure shown in FIG. 6, exemplary details of the obtaining operation (S62) are given, which are inherently independent from each other as such.

Such exemplary obtaining operation (S62) according to exemplary embodiments of the present invention may comprise an operation of retrieving said second sidelink related terminal capabilities from said first data set.

According to a variation of the procedure shown in FIG. 6, exemplary details of the obtaining operation (S62) are given, which are inherently independent from each other as such.

Such exemplary obtaining operation (S62) according to exemplary embodiments of the present invention may comprise an operation of retrieving said second sidelink related terminal capabilities from a second data set different from said first data set.

According to a variation of the procedure shown in FIG. 6, exemplary additional operations are given, which are inherently independent from each other as such. According to such variation, an exemplary method according to exemplary embodiments of the present invention may comprise an operation of, if said retrieving said first sidelink related terminal capabilities from said first data set is unsuccessful, enquiring, from said first terminal, said first sidelink related terminal capabilities.

According to a variation of the procedure shown in FIG. 6, exemplary additional operations are given, which are inherently independent from each other as such. According to such variation, an exemplary method according to exemplary embodiments of the present invention may comprise an operation of, if said first sidelink related terminal capabilities retrieved from said first data set is invalid, enquiring, from said first terminal, said first sidelink related terminal capabilities.

According to a variation of the procedure shown in FIG. 6, exemplary additional operations are given, which are inherently independent from each other as such. According to such variation, an exemplary method according to exemplary embodiments of the present invention may comprise an operation of, if said retrieving said second sidelink related terminal capabilities from said first data set is unsuccessful, enquiring, from said second terminal, said second sidelink related terminal capabilities.

According to a variation of the procedure shown in FIG. 6, exemplary additional operations are given, which are inherently independent from each other as such. According to such variation, an exemplary method according to exemplary embodiments of the present invention may comprise an operation of, if said second sidelink related terminal capabilities retrieved from said first data set is invalid, enquiring, from said second terminal, said second sidelink related terminal capabilities.

According to a variation of the procedure shown in FIG. 6, exemplary additional operations are given, which are inherently independent from each other as such. According to such variation, an exemplary method according to exemplary embodiments of the present invention may comprise an operation of, if said retrieving said second sidelink related terminal capabilities from said first data set is unsuccessful, enquiring, from said first terminal, said second sidelink related terminal capabilities.

According to a variation of the procedure shown in FIG. 6, exemplary additional operations are given, which are inherently independent from each other as such. According to such variation, an exemplary method according to exemplary embodiments of the present invention may comprise an operation of, if said second sidelink related terminal capabilities retrieved from said first data set is invalid, enquiring, from said first terminal, said second sidelink related terminal capabilities.

According to a variation of the procedure shown in FIG. 6, exemplary additional operations are given, which are inherently independent from each other as such. According to such variation, an exemplary method according to exemplary embodiments of the present invention may comprise an operation of, if said retrieving said first sidelink related terminal capabilities from said first data set is unsuccessful and said retrieving said second sidelink related terminal capabilities from said first data set is unsuccessful, enquiring, from said first terminal, said first sidelink related terminal capabilities and said second sidelink related terminal capabilities.

According to a variation of the procedure shown in FIG. 6, exemplary additional operations are given, which are inherently independent from each other as such. According to such variation, an exemplary method according to exemplary embodiments of the present invention may comprise an operation of, if said first sidelink related terminal capabilities retrieved from said first data set is invalid and said second sidelink related terminal capabilities retrieved from said first data set is invalid, enquiring, from said first terminal, said first sidelink related terminal capabilities and said second sidelink related terminal capabilities.

According to a variation of the procedure shown in FIG. 6, exemplary additional operations are given, which are inherently independent from each other as such. According to such variation, an exemplary method according to exemplary embodiments of the present invention may comprise an operation of, if said retrieving said second sidelink related terminal capabilities from said second data set is unsuccessful, demanding to enquire, from said second terminal, said second sidelink related terminal capabilities.

According to a variation of the procedure shown in FIG. 6, exemplary additional operations are given, which are inherently independent from each other as such. According to such variation, an exemplary method according to exemplary embodiments of the present invention may comprise an operation of, if said second sidelink related terminal capabilities retrieved from said second data set is invalid, demanding to enquire, from said second terminal, said second sidelink related terminal capabilities.

According to a variation of the procedure shown in FIG. 6, exemplary details of the obtaining operation (S62) are given, which are inherently independent from each other as such.

Such exemplary obtaining operation (S62) according to exemplary embodiments of the present invention may comprise an operation of enquiring, from said first terminal, said first sidelink related terminal capabilities.

According to a variation of the procedure shown in FIG. 6, exemplary details of the obtaining operation (S62) are given, which are inherently independent from each other as such.

Such exemplary obtaining operation (S62) according to exemplary embodiments of the present invention may comprise an operation of enquiring, from said second terminal, said second sidelink related terminal capabilities.

According to a variation of the procedure shown in FIG. 6, exemplary details of the obtaining operation (S62) are given, which are inherently independent from each other as such.

Such exemplary obtaining operation (S62) according to exemplary embodiments of the present invention may comprise an operation of enquiring, from said first terminal, said second sidelink related terminal capabilities.

According to a variation of the procedure shown in FIG. 6, exemplary details of the obtaining operation (S62) are given, which are inherently independent from each other as such.

Such exemplary obtaining operation (S62) according to exemplary embodiments of the present invention may comprise an operation of enquiring, from said first terminal, said first sidelink related terminal capabilities and said second sidelink related terminal capabilities.

According to a variation of the procedure shown in FIG. 6, exemplary additional operations and exemplary details of the obtaining operation (S62) are given, which are inherently independent from each other as such. Such exemplary obtaining operation (S62) according to exemplary embodiments of the present invention may comprise an operation of receiving said first sidelink related terminal capabilities from said first terminal. Further, according to such variation, an exemplary method according to exemplary embodiments of the present invention may comprise an operation of supplying said first sidelink related terminal capabilities to said first data set.

According to a variation of the procedure shown in FIG. 6, exemplary additional operations and exemplary details of the obtaining operation (S62) are given, which are inherently independent from each other as such. Such exemplary obtaining operation (S62) according to exemplary embodiments of the present invention may comprise an operation of receiving said second sidelink related terminal capabilities from said second terminal. Further, according to such variation, an exemplary method according to exemplary embodiments of the present invention may comprise an operation of supplying said second sidelink related terminal capabilities to said first data set.

According to a variation of the procedure shown in FIG. 6, exemplary additional operations and exemplary details of the obtaining operation (S62) are given, which are inherently independent from each other as such. Such exemplary obtaining operation (S62) according to exemplary embodiments of the present invention may comprise an operation of receiving said second sidelink related terminal capabilities from said first terminal. Further, according to such variation, an exemplary method according to exemplary embodiments of the present invention may comprise an operation of supplying said second sidelink related terminal capabilities to said first data set.

According to a variation of the procedure shown in FIG. 6, exemplary additional operations and exemplary details of the obtaining operation (S62) are given, which are inherently independent from each other as such. Such exemplary obtaining operation (S62) according to exemplary embodiments of the present invention may comprise an operation of receiving said first sidelink related terminal capabilities and said second sidelink related terminal capabilities from said first terminal. Further, according to such variation, an exemplary method according to exemplary embodiments of the present invention may comprise an operation of supplying said first sidelink related terminal capabilities and said second sidelink related terminal capabilities to said first data set.

According to a variation of the procedure shown in FIG. 6, exemplary additional operations and exemplary details of the obtaining operation (S62) are given, which are inherently independent from each other as such. Such exemplary obtaining operation (S62) according to exemplary embodiments of the present invention may comprise an operation of receiving said second sidelink related terminal capabilities via an inter network signaling from a network serving said second terminal. Further, according to such variation, an exemplary method according to exemplary embodiments of the present invention may comprise an operation of supplying said second sidelink related terminal capabilities to said first data set.

According to further exemplary embodiments of the present invention, said first data set and said second data set comprise at least information on sidelink related terminal capabilities.

According to further exemplary embodiments of the present invention, at least one of said first data set and said second data set comprises information on sidelink related terminal capabilities and at least one of information on bands supported for sidelink communication, information on band combinations supported for sidelink communication, information on traffic patterns supported for sidelink communication, and information on a measured sidelink related channel busy ratio, information on sidelink channel conditions, and information on sidelink measurement reports.

According to further exemplary embodiments of the present invention, said request for said sidelink connection comprises a first terminal identifier of said first terminal and a second terminal identifier of said second terminal, and said obtaining is performed based on said first terminal identifier and said second terminal identifier.

According to a variation of the procedure shown in FIG. 6, exemplary details of the setting operation (S64) are given, which are inherently independent from each other as such.

Such exemplary setting operation (S64) according to exemplary embodiments of the present invention may comprise an operation of creating a new feature set corresponding to said intersection set.

According to a variation of the procedure shown in FIG. 6, exemplary additional operations are given, which are inherently independent from each other as such. According to such variation, an exemplary method according to exemplary embodiments of the present invention may comprise an operation of transmitting, to said first terminal, said configuration for said sidelink connection.

According to further exemplary embodiments of the present invention, said procedure is operable at or by a base station or access node of a cellular system.

According to further exemplary embodiments of the present invention, said procedure is operable in at least one of a LTE, a LTE-A, and a 5G cellular system supporting sidelink communications.

According to further exemplary embodiments of the present invention, said procedure is operable for assisting sidelink communications between communication devices.

According to further exemplary embodiments of the present invention, said sidelink communication is a device to device communication via a PC5 interface between said first terminal and said second terminal.

Figure 3:
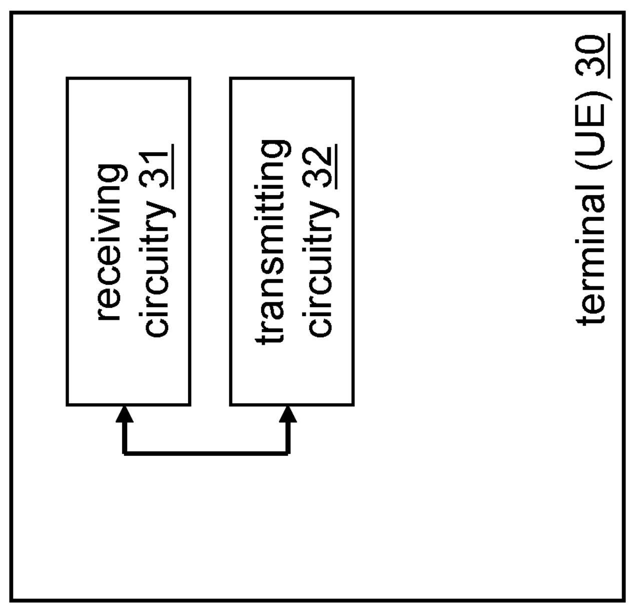
FIG. 3 is a block diagram illustrating an apparatus according to exemplary embodiments of the present invention.
Figure 7:
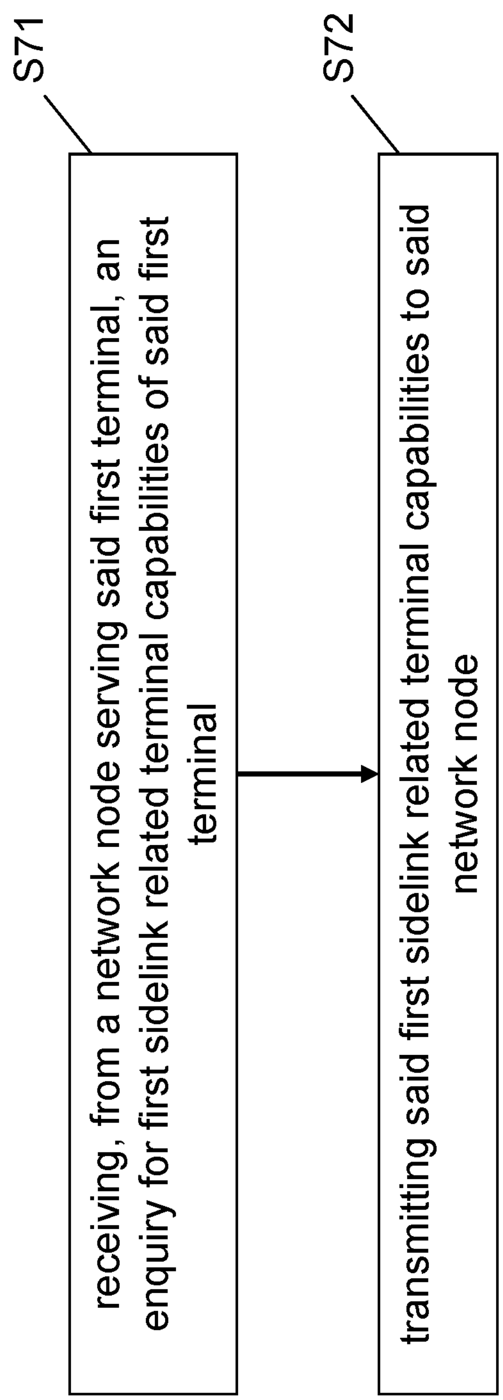
FIG. 7 is a schematic diagram of a procedure according to exemplary embodiments of the present invention.

FIG. 3 is a block diagram illustrating an apparatus according to exemplary embodiments of the present invention. The apparatus may be a terminal 30 such as a user equipment (UE) (being a first terminal attempting a sidelink connection between said first terminal and a second terminal) comprising a receiving circuitry 31 and a transmitting circuitry 32. The receiving circuitry 31 receives, from a network node serving said first terminal, an enquiry for first sidelink related terminal capabilities of said first terminal. The transmitting circuitry 32 transmits said first sidelink related terminal capabilities to said network node. FIG. 7 is a schematic diagram of a procedure according to exemplary embodiments of the present invention. The apparatus according to FIG. 3 may perform the method of FIG. 7 but is not limited to this method. The method of FIG. 7 may be performed by the apparatus of FIG. 3 but is not limited to being performed by this apparatus.

As shown in FIG. 7, a procedure according to exemplary embodiments of the present invention comprises an operation of receiving (S71), from a network node serving said first terminal, an enquiry for first sidelink related terminal capabilities of said first terminal, and an operation of transmitting (S72) said first sidelink related terminal capabilities to said network node.

In an embodiment at least some of the functionalities of the apparatus shown in FIG. 3 may be shared between two physically separate devices forming one operational entity. Therefore, the apparatus may be seen to depict the operational entity comprising one or more physically separate devices for executing at least some of the described processes.

According to a variation of the procedure shown in FIG. 7, exemplary additional operations are given, which are inherently independent from each other as such. According to such variation, an exemplary method according to exemplary embodiments of the present invention may comprise an operation of receiving, from said network node, a configuration for said sidelink connection.

According to further exemplary embodiments of the present invention, the procedure is operable at or by a terminal, user equipment, mobile station or modem.

According to further exemplary embodiments of the present invention, the procedure is operable in at least one of a LTE, a LTE-A, and a 5G cellular system supporting sidelink communications According to further exemplary embodiments of the present invention, the procedure is operable for assisting sidelink communications between communication devices.

According to further exemplary embodiments of the present invention, said sidelink communication is a device to device communication via a PC5 interface between said first terminal and said second terminal.

Figure 4:
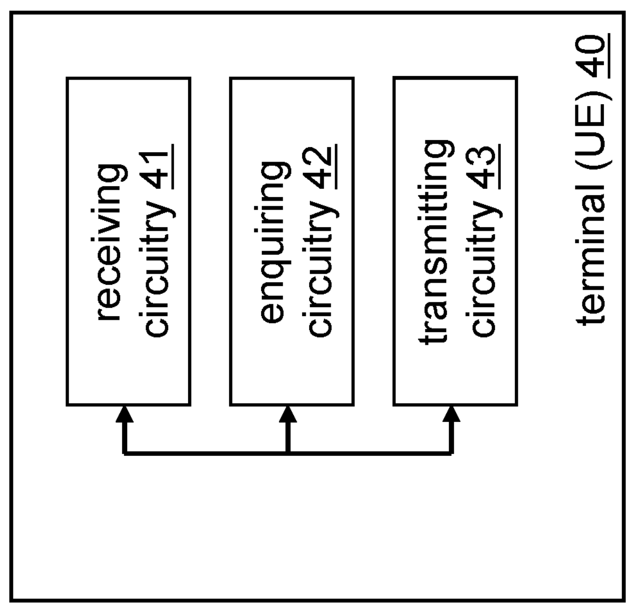
FIG. 4 is a block diagram illustrating an apparatus according to exemplary embodiments of the present invention.
Figure 8:
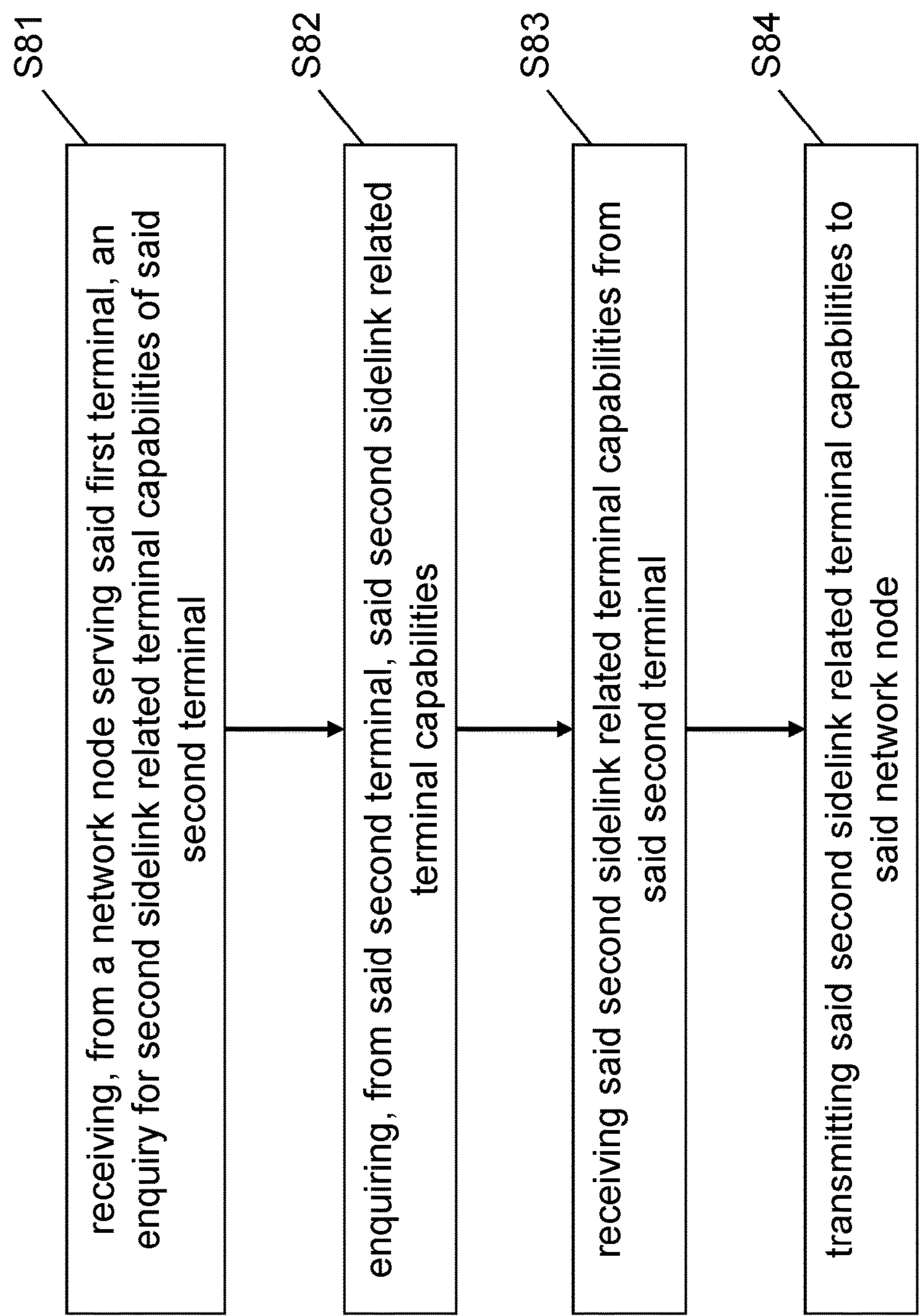
FIG. 8 is a schematic diagram of a procedure according to exemplary embodiments of the present invention.

FIG. 4 is a block diagram illustrating an apparatus according to exemplary embodiments of the present invention. The apparatus may be a terminal 40 such as a user equipment (UE) (being a first terminal attempting a sidelink connection between said first terminal and a second terminal) comprising a receiving circuitry 41, an enquiring circuitry 42, and a transmitting circuitry 43. The receiving circuitry 41 receives, from a network node serving said first terminal, an enquiry for second sidelink related terminal capabilities of said second terminal. The enquiring circuitry 42 enquires, from said second terminal, said second sidelink related terminal capabilities. The receiving circuitry 41 further receives said second sidelink related terminal capabilities from said second terminal. The transmitting circuitry 43 transmits said second sidelink related terminal capabilities to said network node. FIG. 8 is a schematic diagram of a procedure according to exemplary embodiments of the present invention. The apparatus according to FIG. 4 may perform the method of FIG. 8 but is not limited to this method. The method of FIG. 8 may be performed by the apparatus of FIG. 4 but is not limited to being performed by this apparatus.

As shown in FIG. 8, a procedure according to exemplary embodiments of the present invention comprises an operation of receiving (S81), from a network node serving said first terminal, an enquiry for second sidelink related terminal capabilities of said second terminal, an operation of enquiring (S82), from said second terminal, said second sidelink related terminal capabilities, an operation of receiving (S83) said second sidelink related terminal capabilities from said second terminal, and an operation of transmitting (S84) said second sidelink related terminal capabilities to said network node.

In an embodiment at least some of the functionalities of the apparatus shown in FIG. 4 may be shared between two physically separate devices forming one operational entity. Therefore, the apparatus may be seen to depict the operational entity comprising one or more physically separate devices for executing at least some of the described processes.

According to a variation of the procedure shown in FIG. 8, exemplary additional operations are given, which are inherently independent from each other as such. According to such variation, an exemplary method according to exemplary embodiments of the present invention may comprise an operation of receiving, from said network node, a configuration for said sidelink connection.

According to further exemplary embodiments of the present invention, the procedure is operable at or by a terminal, user equipment, mobile station or modem.

According to further exemplary embodiments of the present invention, the procedure is operable in at least one of a LTE, a LTE-A, and a 5G cellular system supporting sidelink communications According to further exemplary embodiments of the present invention, the procedure is operable for assisting sidelink communications between communication devices.

According to further exemplary embodiments of the present invention, said sidelink communication is a device to device communication via a PC5 interface between said first terminal and said second terminal.

Figure 5:
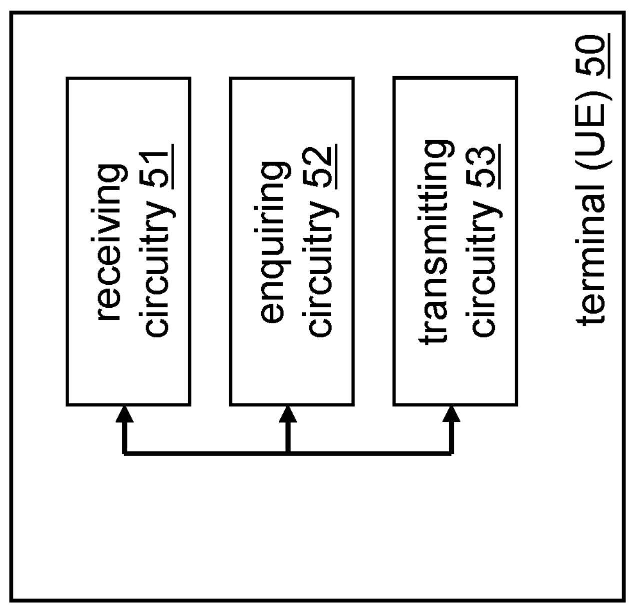
FIG. 5 is a block diagram illustrating an apparatus according to exemplary embodiments of the present invention.
Figure 9:
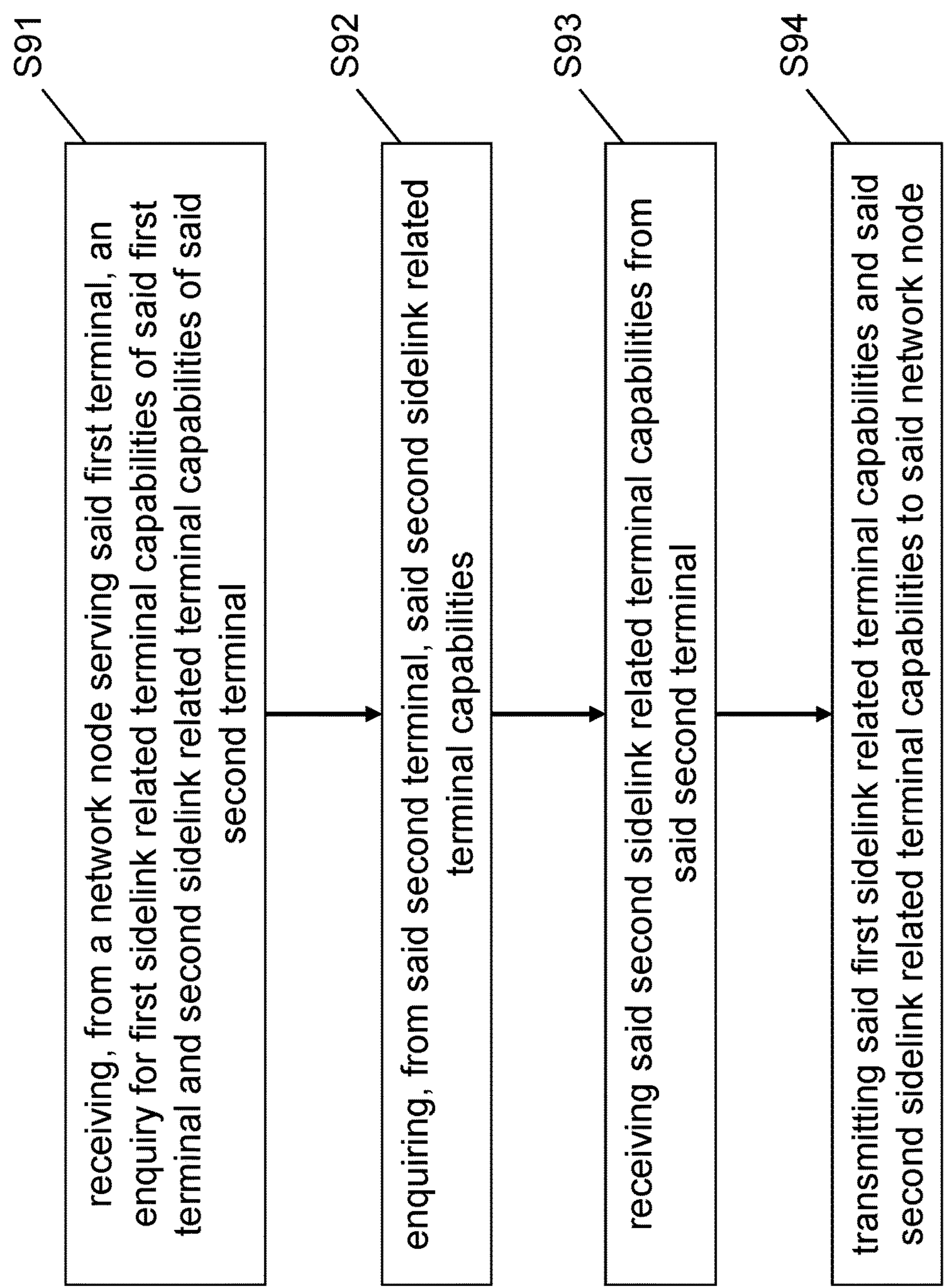
FIG. 9 is a schematic diagram of a procedure according to exemplary embodiments of the present invention.
Figure 10:
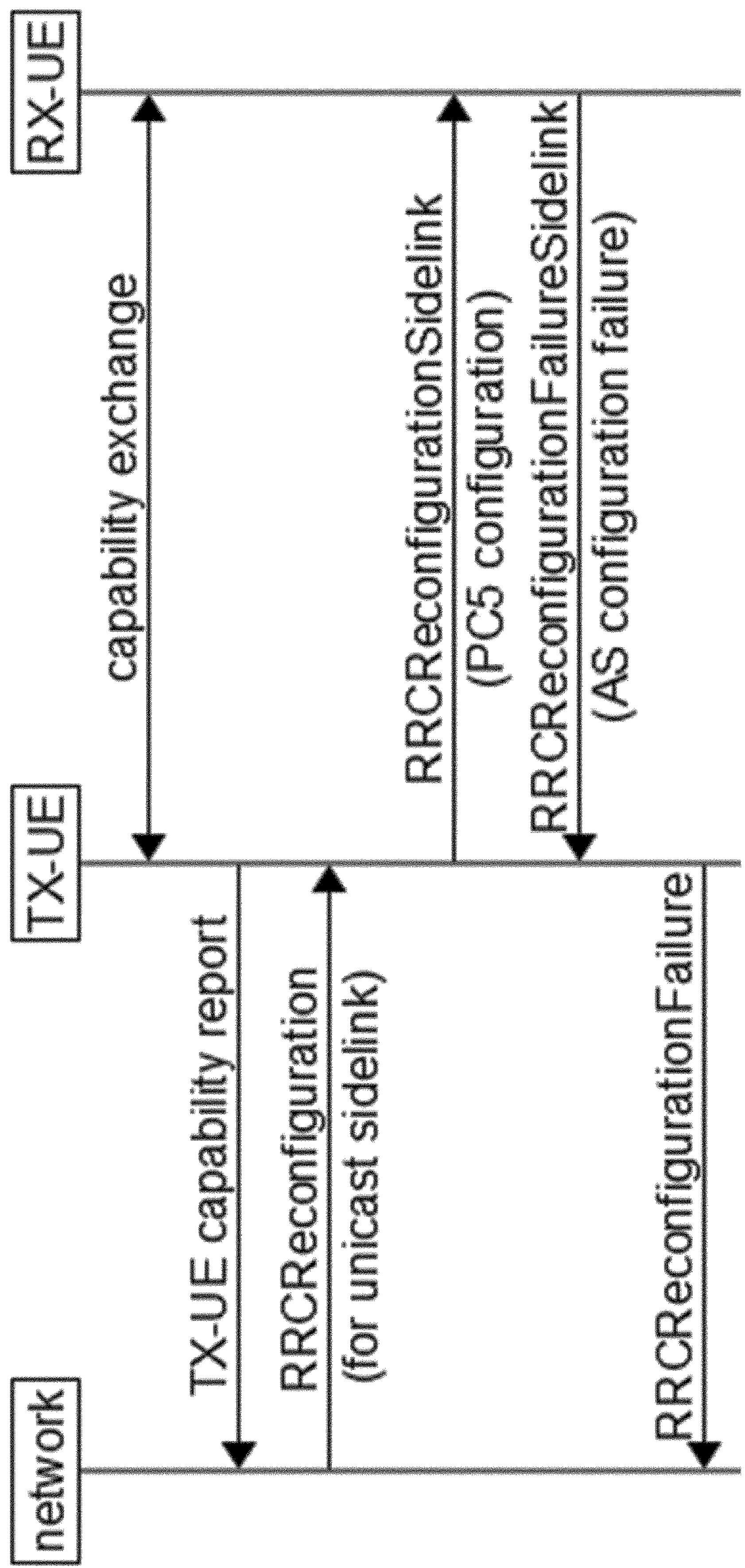
FIG. 10 shows a schematic diagram of an example of a system environment with signaling variants.

FIG. 5 is a block diagram illustrating an apparatus according to exemplary embodiments of the present invention. The apparatus may be a terminal 50 such as a user equipment (UE) (being a first terminal attempting a sidelink connection between said first terminal and a second terminal) comprising a receiving circuitry 51, an enquiring circuitry 52, and a transmitting circuitry 53. The receiving circuitry 51 receives, from a network node serving said first terminal, an enquiry for first sidelink related terminal capabilities of said first terminal and second sidelink related terminal capabilities of said second terminal. The enquiring circuitry 52 enquires, from said second terminal, said second sidelink related terminal capabilities. The receiving circuitry 51 further receives said second sidelink related terminal capabilities from said second terminal. The transmitting circuitry 53 transmits said first sidelink related terminal capabilities and said second sidelink related terminal capabilities to said network node. FIG. 9 is a schematic diagram of a procedure according to exemplary embodiments of the present invention. The apparatus according to FIG. 5 may perform the method of FIG. 9 but is not limited to this method. The method of FIG. 9 may be performed by the apparatus of FIG. 5 but is not limited to being performed by this apparatus.

As shown in FIG. 9, a procedure according to exemplary embodiments of the present invention comprises an operation of receiving (S91), from a network node serving said first terminal, an enquiry for first sidelink related terminal capabilities of said first terminal and second sidelink related terminal capabilities of said second terminal, an operation of enquiring (S92), from said second terminal, said second sidelink related terminal capabilities, an operation of receiving (S93) said second sidelink related terminal capabilities from said second terminal, and an operation of transmitting (S94) said first sidelink related terminal capabilities and said second sidelink related terminal capabilities to said network node.

In an embodiment at least some of the functionalities of the apparatus shown in FIG. 5 may be shared between two physically separate devices forming one operational entity. Therefore, the apparatus may be seen to depict the operational entity comprising one or more physically separate devices for executing at least some of the described processes.

According to a variation of the procedure shown in FIG. 9, exemplary additional operations are given, which are inherently independent from each other as such. According to such variation, an exemplary method according to exemplary embodiments of the present invention may comprise an operation of receiving, from said network node, a configuration for said sidelink connection.

According to further exemplary embodiments of the present invention, the procedure is operable at or by a terminal, user equipment, mobile station or modem.

According to further exemplary embodiments of the present invention, the procedure is operable in at least one of a LTE, a LTE-A, and a 5G cellular system supporting sidelink communications According to further exemplary embodiments of the present invention, the procedure is operable for assisting sidelink communications between communication devices.

According to further exemplary embodiments of the present invention, said sidelink communication is a device to device communication via a PC5 interface between said first terminal and said second terminal.

In the following, exemplary embodiments of the present invention are discussed in more detail.

According to exemplary embodiments of the present invention, AS configuration failure in sidelink due to different UE capabilities of TX- and RX-side UE can be prevented.

This is achieved in that a minimum set (intersection set) of the capabilities of a first UE of a sidelink connection (TX UE) and the capabilities of a second UE of the sidelink connection (RX UE) is generated and used for the determination of the sidelink configuration for the two UE's.

Heretofore, according to exemplary embodiments of the present invention, a new functional and logical component being embodied e.g. as a database e.g. named "PC5-DB" or more general as any data set or data container e.g. named "PC5 data set" is added in the control plane part of the 5G system architecture.

Figure 11:
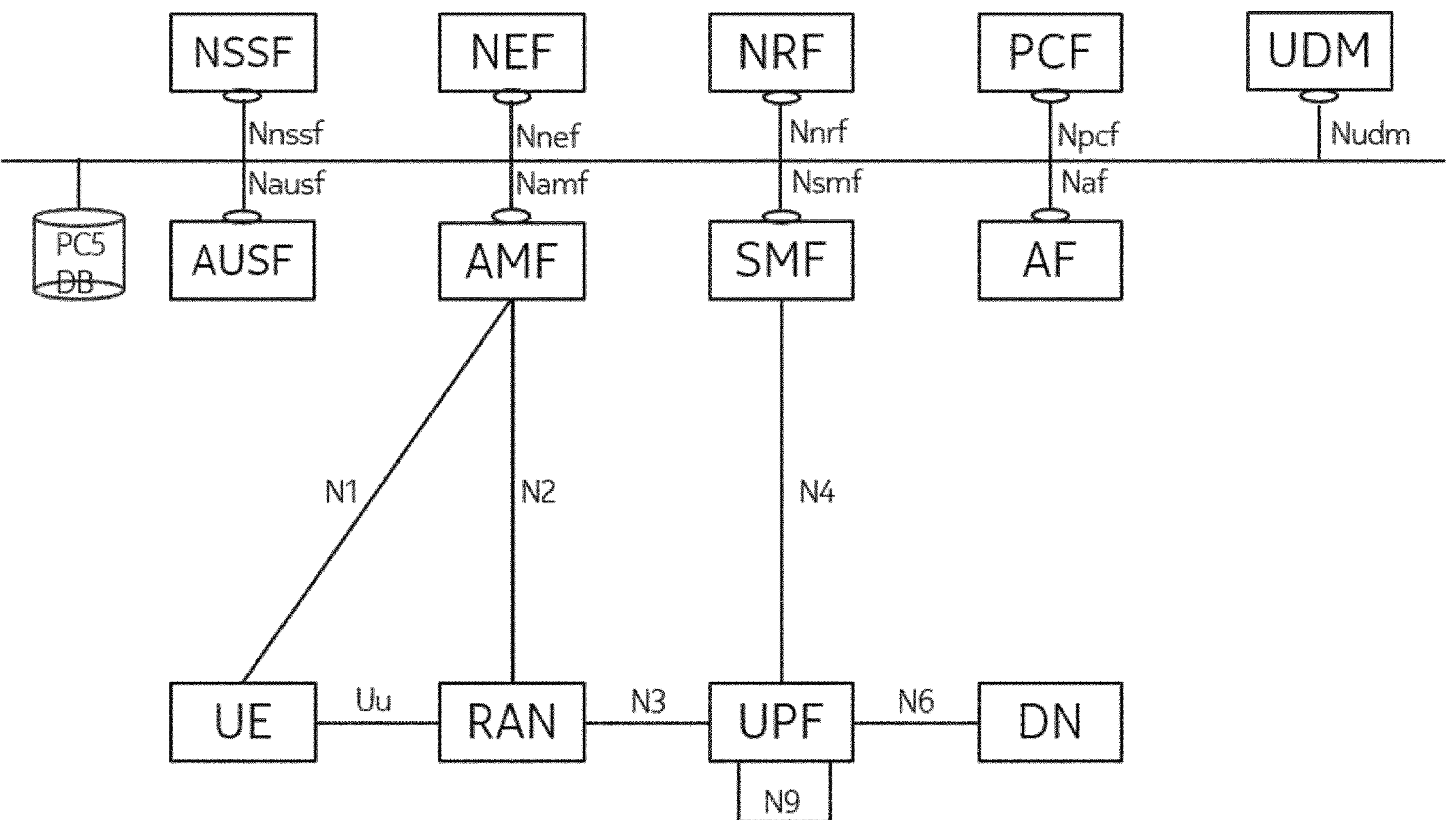
FIG. 11 shows a schematic diagram of an example of a system architecture according to exemplary embodiments of the present invention.

FIG. 11 shows a schematic diagram of an example of a system architecture according to exemplary embodiments of the present invention.

In particular, FIG. 11 illustrates the exemplary system architecture with the logical component according to exemplary embodiments of the present invention ("PC5-DB"/"PC5 data set") for a non-roaming case.

Figure 12:
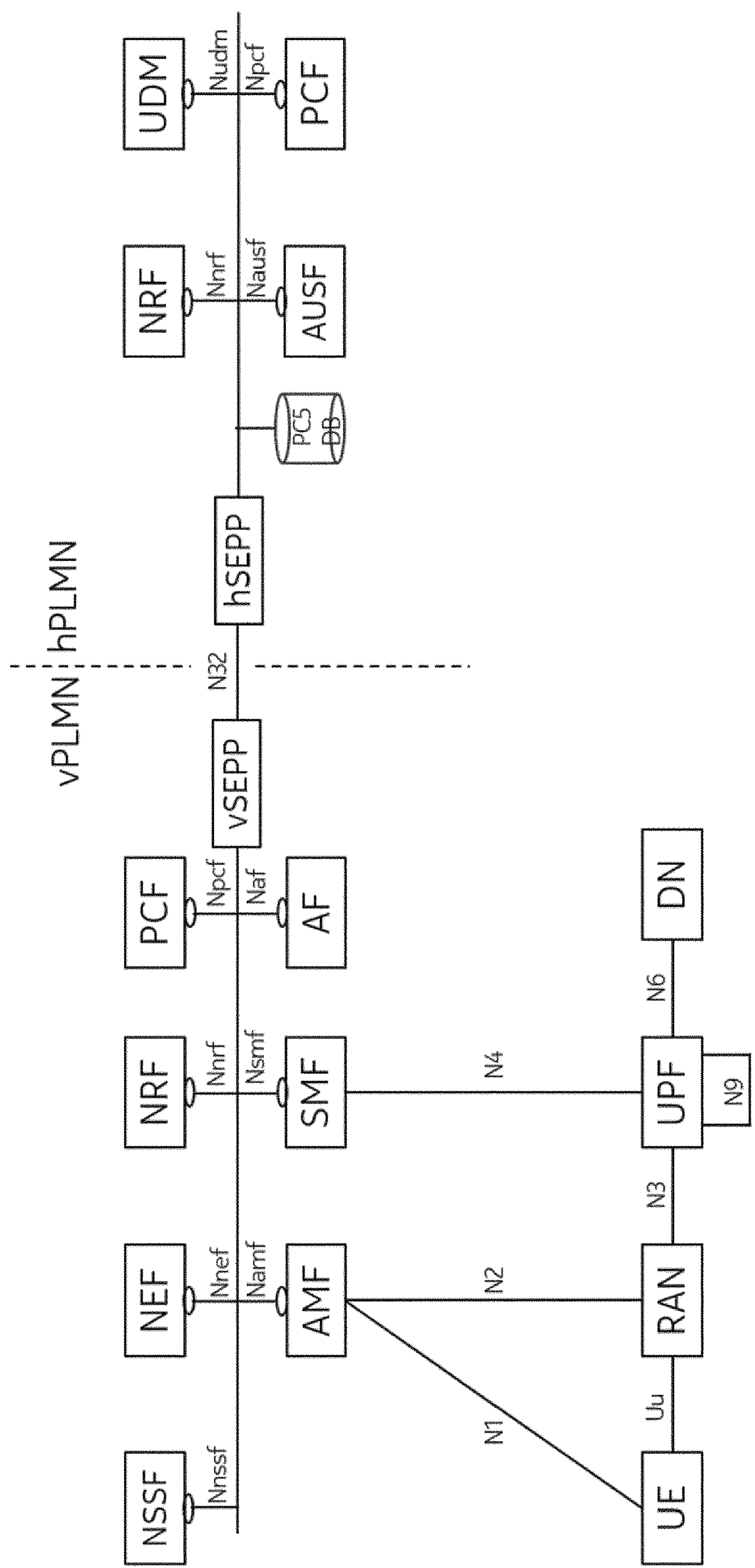
FIG. 12 shows a schematic diagram of an example of a system architecture according to exemplary embodiments of the present invention.

FIG. 12 shows a schematic diagram of an example of a system architecture according to exemplary embodiments of the present invention.

In particular, FIG. 12 illustrates the exemplary system architecture with the (new) logical component according to exemplary embodiments of the present invention ("PC5-DB"/"PC5 data set") in the home public land mobile network (hPLMN, H-PLMN) for a roaming case.

The logical component according to exemplary embodiments of the present invention ("PC5-DB"/"PC5 data set")

may be for example a new/dedicated database or may be a data set or a container in an already existing database.

According to exemplary embodiments of the present invention, the (new) logical component ("PC5-DB"/"PC5 data set") is a database function and can be implemented as a separate entity as shown in FIGS. 11 and 12 or it can be embedded as a logical function to either unified data repository (UDR) or unified data management (UDM).

An advantage of such separate database in the network core of the H-PLMN is that the network has all relevant information needed for configuration of PC5 communication available in one logical function. This reduces drastically Uu signaling, as a UE does not need to report sidelink information each time the UE wants to communicate over sidelink and requests PC5 configuration (here, it is assumed that the UE is in RRC CONNECTED state and in PC5 resource allocation mode 1 in NR (mode 3 in LTE)).

According to exemplary embodiments of the present invention, the database/data set is updated once whenever the UE sends its UE capability information report in uplink (the UE only needs to send this information one time).

This implementation is particularly advantageous in the case that the UE type and UE capabilities is/are unknown to the network.

According to alternative exemplary embodiments of the present invention, the database/data set contains prestored data about the UE capabilities provided from the network operator.

This implementation is particularly advantageous in the case that the UE type and UE capabilities is/are known to the network e.g. because the UE is embedded in a vehicle.

In other words, according to exemplary embodiments of the present invention, the (new) logical component ("PC5-DB"/"PC5 data set") is prefilled with the UE-specific data provided by the operator (for example when the UE is embedded in a vehicle and UE capabilities are known to the operator).

According to further exemplary embodiments of the present invention, the data is filled into the (new) logical component ("PC5-DB"/"PC5 data set"), when a UE reports its UE capability information upon receiving a UE capability enquiry from the network (applicable e.g. for UEs if the operator just provides a SIM card and the UE capabilities are unknown to the operator).

However, in the latter case, the UE needs to report its UE capability information only once. Namely, according to exemplary embodiments of the present invention, the network stores the UE-specific reported UE capability information received from the UE in the (new) logical component ("PC5-DB"/"PC5 data set").

In 5GC the new logical component according to exemplary embodiments of the present invention ("PC5-DB"/"PC5 data set") needs connection to the unified data repository (UDR), the policy control function (PCF) (home or visiting) and the access and mobility management function (AMF) for the PC5 provisioning of NR-sidelink. Accordingly, in LTE-EPC (EPC: evolved packet core) the new logical component according to exemplary embodiments of the present invention ("PC5-DB"/"PC5 data set") needs connection to the home subscriber server (HSS)/unified data management (UDM) and the vehicle-to-X control function (V2X CF) (home or visiting) for the LTE sidelink provisioning.

The new logical component according to exemplary embodiments of the present invention ("PC5-DB"/"PC5 data set") has a service-based interface i.e. an application programming interface (API).

In other words, according to exemplary embodiments of the present invention, the (new) logical component ("PC5-DB"/"PC5 data set") provides a service-based interface to all other 5GS functions via an API and allows to provide the data stored in the (new) logical component ("PC5-DB"/"PC5 data set") also to other public land mobile networks (PLMN) over the N32 interface.

According to further exemplary embodiments of the present invention, the new logical component ("PC5-DB"/"PC5 data set") can also contain additional data sets like sidelink UE information (supported LTE-V2X and NR-V2X bands, band combinations), sidelink assistance information (traffic patterns), scan reports, a measured (sidelink related) channel busy ratio (CBR), and/or information on further sidelink channel conditions and further sidelink measurement reports.

According to exemplary embodiments of the present invention, the UE specific data stored centrally in the new logical component ("PC5-DB"/"PC5 data set") is used by the network for PC5 configuration, to thereby actively avoid the above-described AS configuration failure.

According to exemplary embodiments of the present invention, when the network of the initiating UE (TX UE) sets up (determines, sets) the PC5 (sidelink) configuration, the UE capabilities of the two UEs that want to communicate over unicast sidelink are requested by the AMF from the new logical component ("PC5-DB"/"PC5 data set"). Here, the new logical component ("PC5-DB"/"PC5 data set") can be hosted in different PLMNs, if the two UEs that want to communicate over unicast sidelink belong to different PLMNs or are in roaming situation.

According to exemplary embodiments of the present invention, the radio resource control of the gNB controlling the initiating UE (TX UE) constructs a new minimum set out of the two UE capabilities that both UEs can comply with and finally sends the PC5 configuration information in a RRCReconfiguration message to the initiating UE (TX UE).

Subsequently, the initiating UE (TX UE) sends this sidelink configuration in a PC5Reconfiguration message to its peer UE (RX UE).

In more specific terms, according to exemplary embodiments of the present invention, when the initiating UE (TX UE) in RRC CONNECTED state requests to its gNB to establish a PC5 unicast sidelink connection with its peer UE (RX UE), the network of the initiating UE (TX UE) executes the following steps or a subset thereof.

These are explained with reference to FIGS. 13 to 20.

Here, FIGS. 13 and 15 to 20 respectively show schematic diagrams of examples of a system environment with signaling variants according to exemplary embodiments of the present invention.

Figure 13:
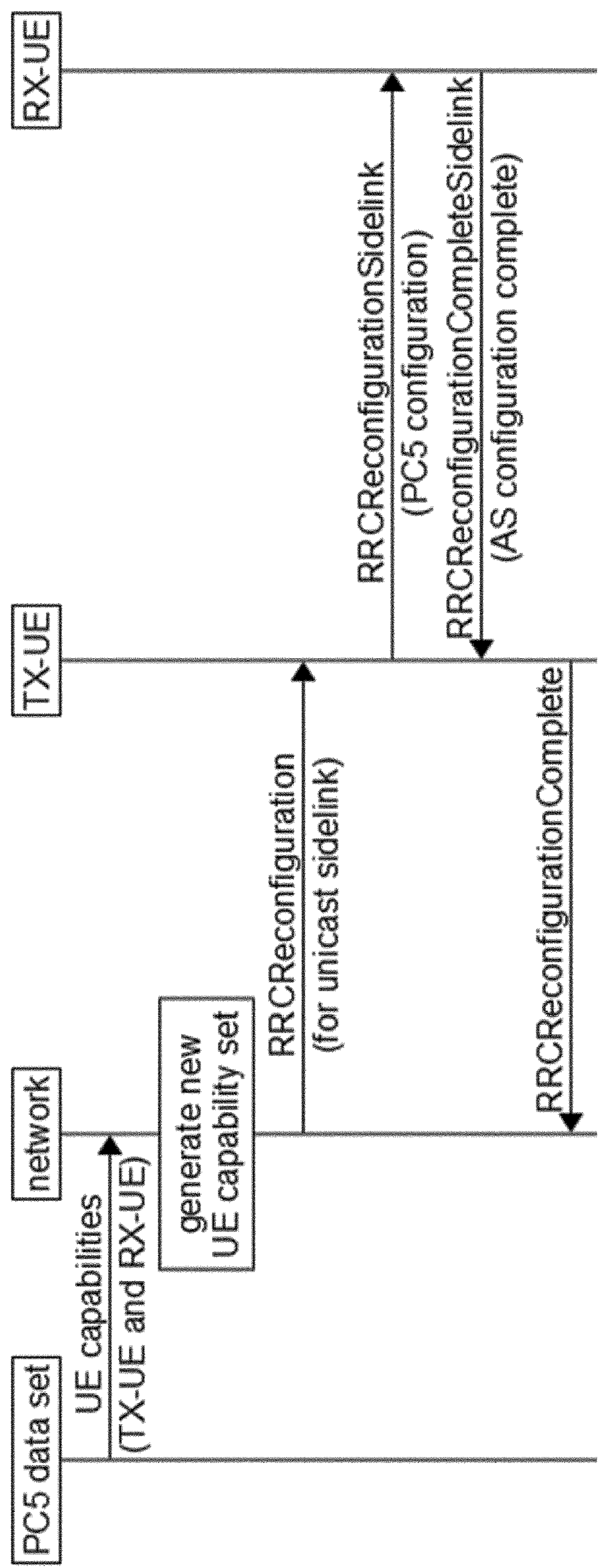
FIG. 13 shows a schematic diagram of an example of a system environment with signaling variants according to exemplary embodiments of the present invention.
Figure 15:
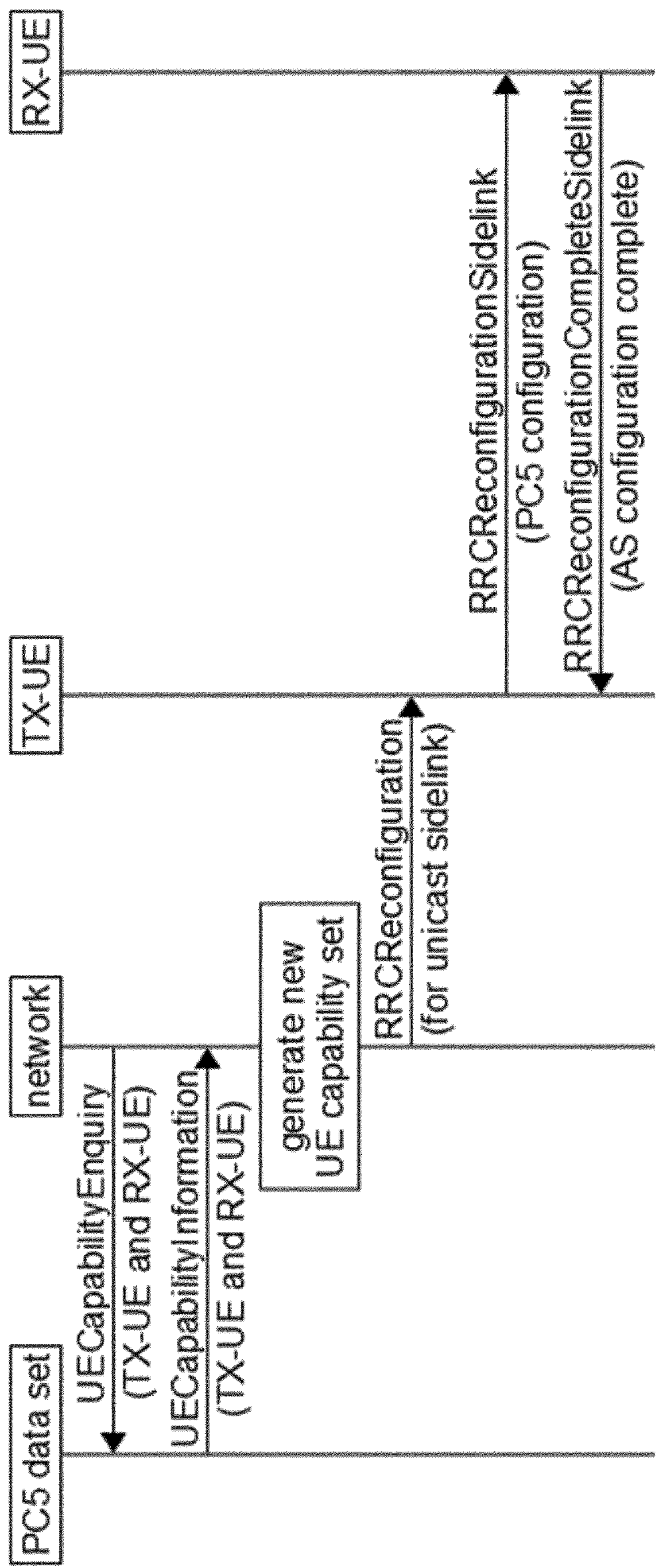
FIG. 15 shows a schematic diagram of an example of a system environment with signaling variants according to exemplary embodiments of the present invention.

In particular, FIGS. 13 and 15 illustrate a signal flow for a case in which the capability information of both the TX UE and the RX UE is available in a single new logical component ("PC5-DB"/"PC5 data set"). It is shown that the UE capability of the TX UE and the RX UE is requested from the new logical component ("PC5-DB"/"PC5 data set") and a new UE capability set is constructed.

Figure 16:
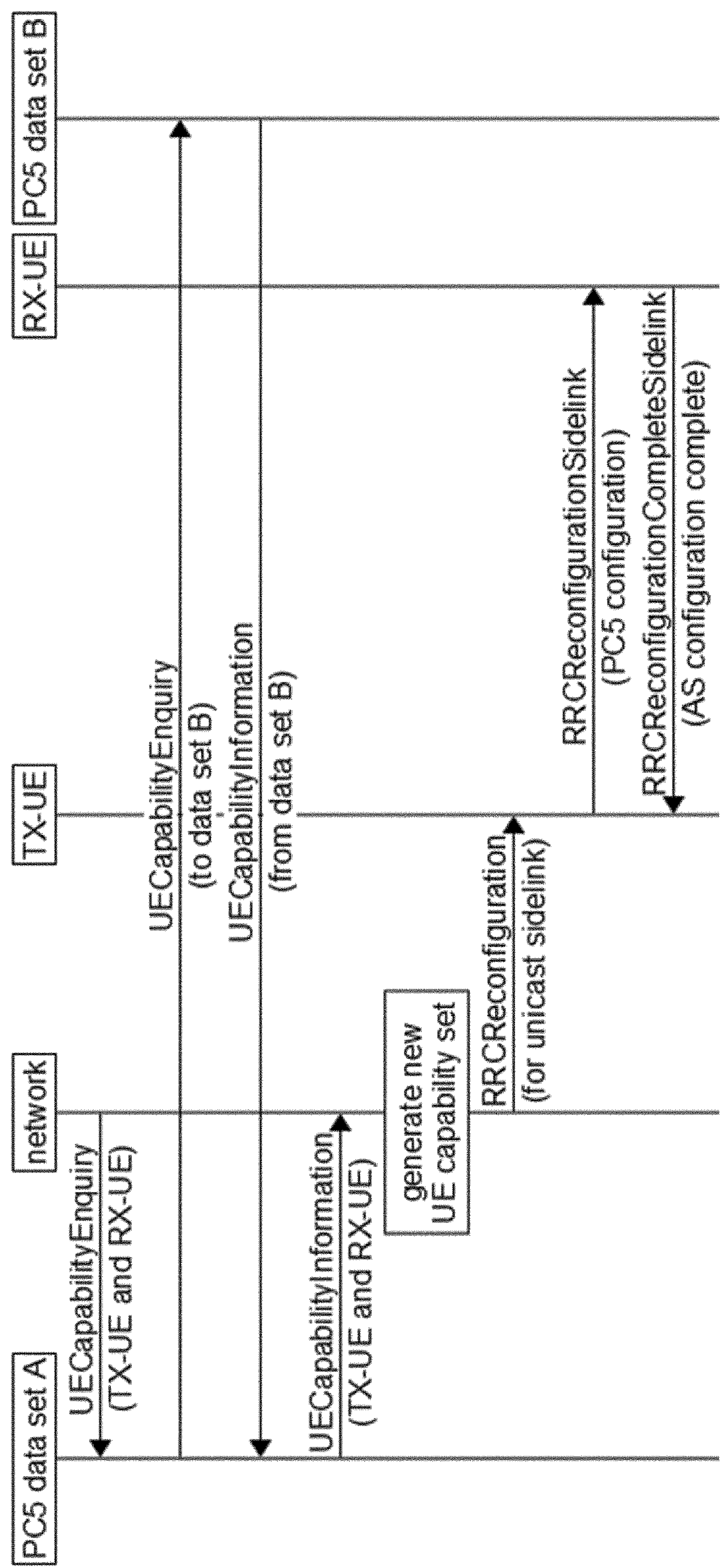
FIG. 16 shows a schematic diagram of an example of a system environment with signaling variants according to exemplary embodiments of the present invention.

FIG. 16 illustrates a signal flow for a case in which the capability information of both the TX UE and the RX UE is available in a separate (dual) new logical components ("PC5-DB"/"PC5 data set"), in particular in PC5 data set A and PC5 data set B.

Figure 17:
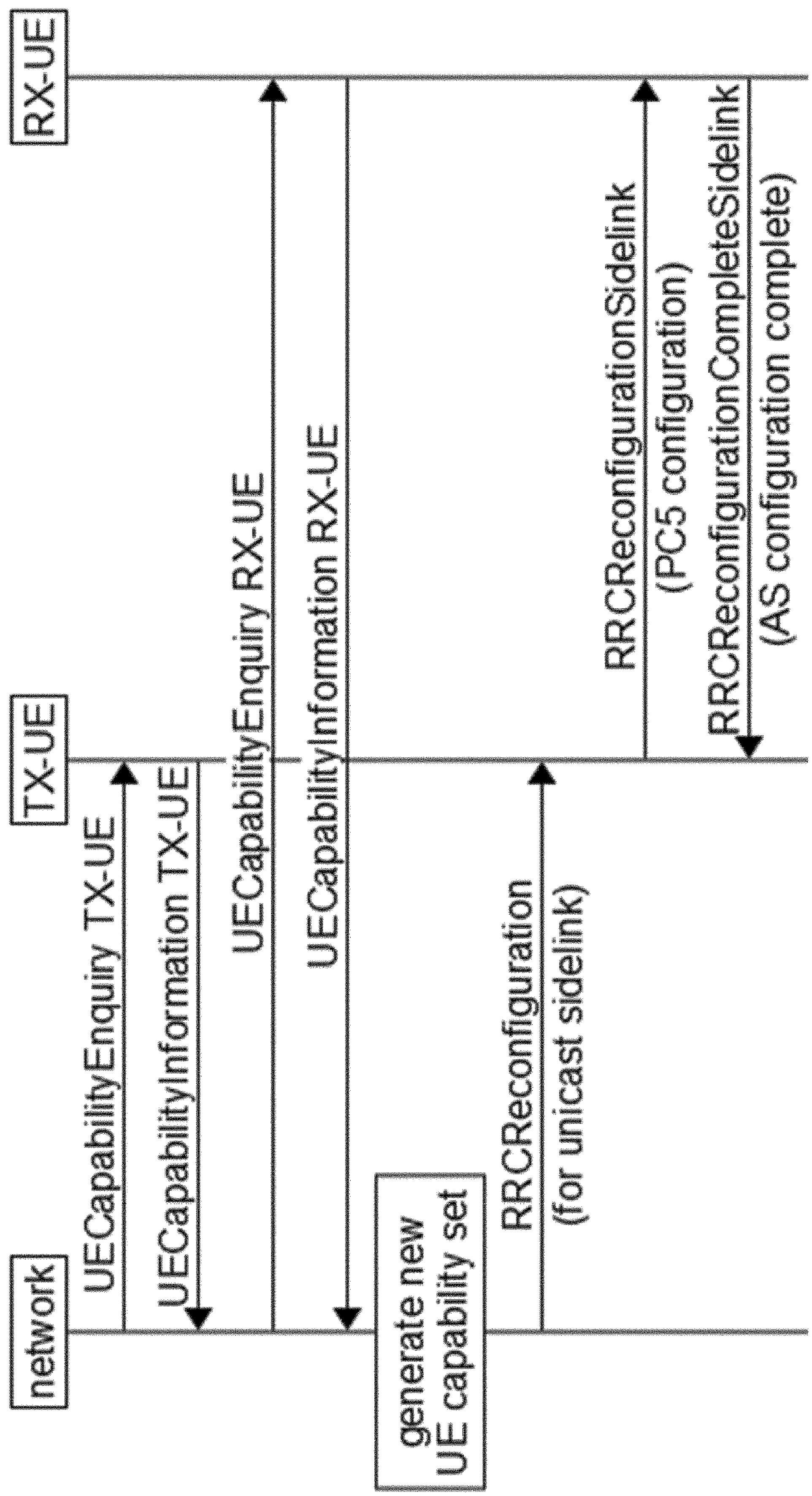
FIG. 17 shows a schematic diagram of an example of a system environment with signaling variants according to exemplary embodiments of the present invention.

FIG. 17 illustrates a signal flow for a case in which no new logical component ("PC5-DB"/"PC5 data set") is provided and the capability information of both the TX UE and the RX UE is enquired from the respective UE. This signaling flow is also applicable for the case the capability information of both the TX UE and the RX UE cannot be retrieved from the new logical component ("PC5-DB"/"PC5 data set") or the capability information of both the TX UE and the RX UE at the new logical component ("PC5-DB"/"PC5 data set") is invalid.

Figure 18:
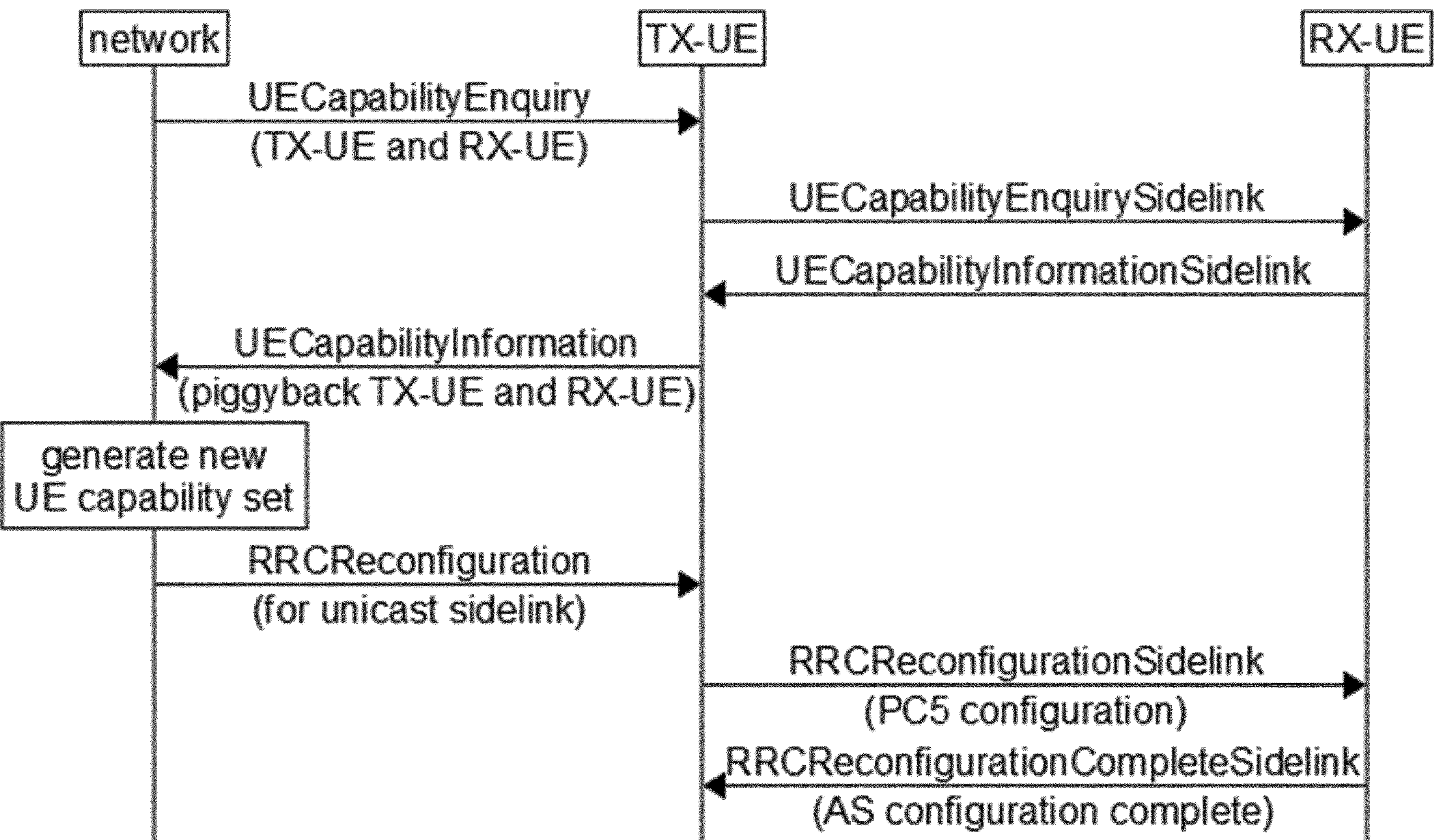
FIG. 18 shows a schematic diagram of an example of a system environment with signaling variants according to exemplary embodiments of the present invention.

FIG. 18 illustrates a signal flow for a case in which no new logical component ("PC5-DB"/"PC5 data set") is provided and the capability information of both the TX UE and the RX UE is enquired from the TX UE and provided in a common message to the network. This signaling flow is also applicable for the case the capability information of both the TX UE and the RX UE cannot be retrieved from the new logical component ("PC5-DB"/"PC5 data set") or the capability information of both the TX UE and the RX UE at the new logical component ("PC5-DB"/"PC5 data set") is invalid.

Figure 19:
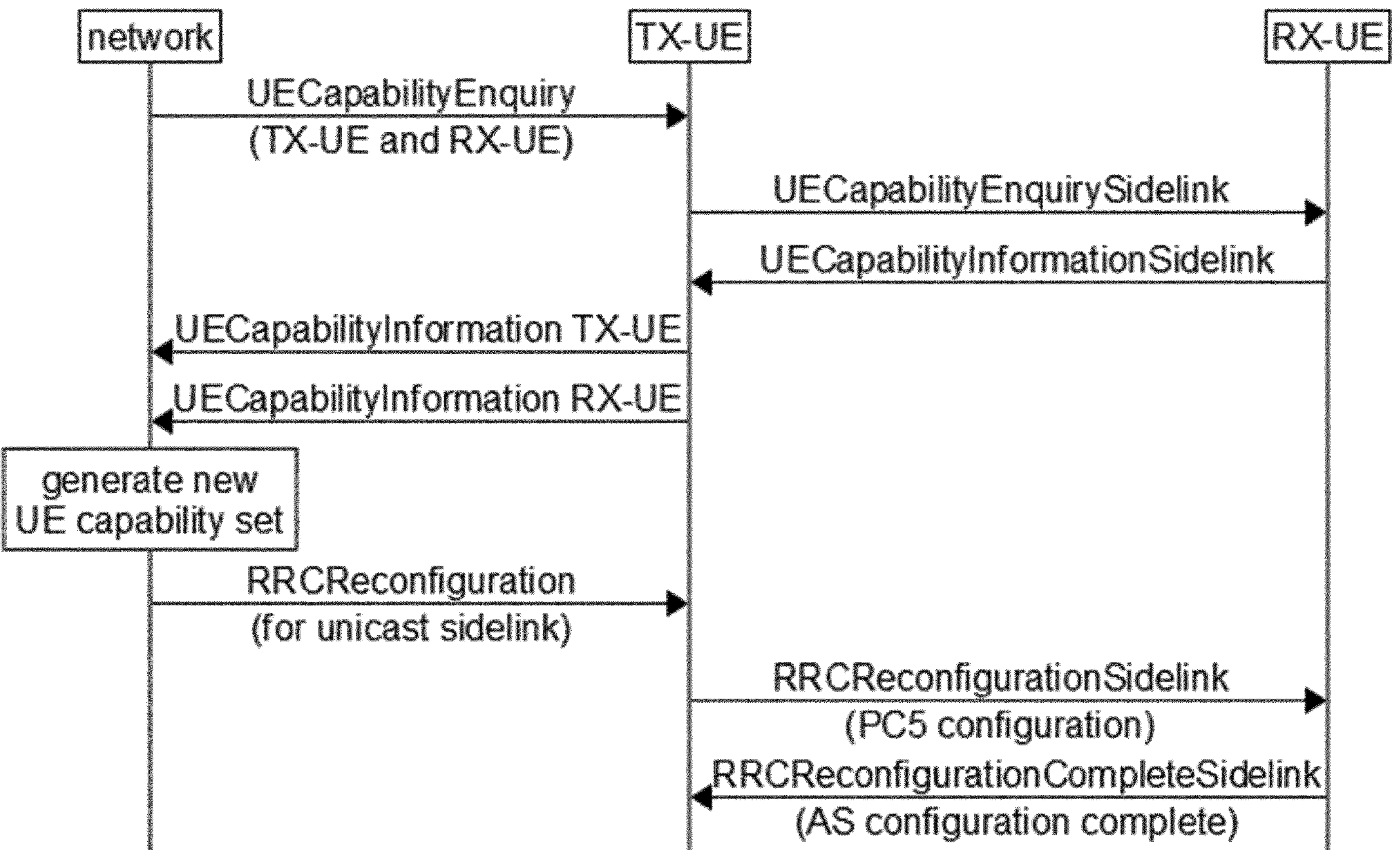
FIG. 19 shows a schematic diagram of an example of a system environment with signaling variants according to exemplary embodiments of the present invention.

FIG. 19 illustrates a signal flow for a case in which no new logical component ("PC5-DB"/"PC5 data set") is provided and the capability information of both the TX UE and the RX UE is enquired from the TX UE and provided in separate messages to the network. Here, it is noted that besides the option illustrated in FIG. 19, the "UECapabilityInformation RX-UE" may alternatively also be provided before the "UECapabilityInformation TX-UE". This signaling flow is also applicable for the case the capability information of both the TX UE and the RX UE cannot be retrieved from the new logical component ("PC5-DB"/"PC5 data set") or the capability information of both the TX UE and the RX UE at the new logical component ("PC5-DB"/"PC5 data set") is invalid.

Figure 20:
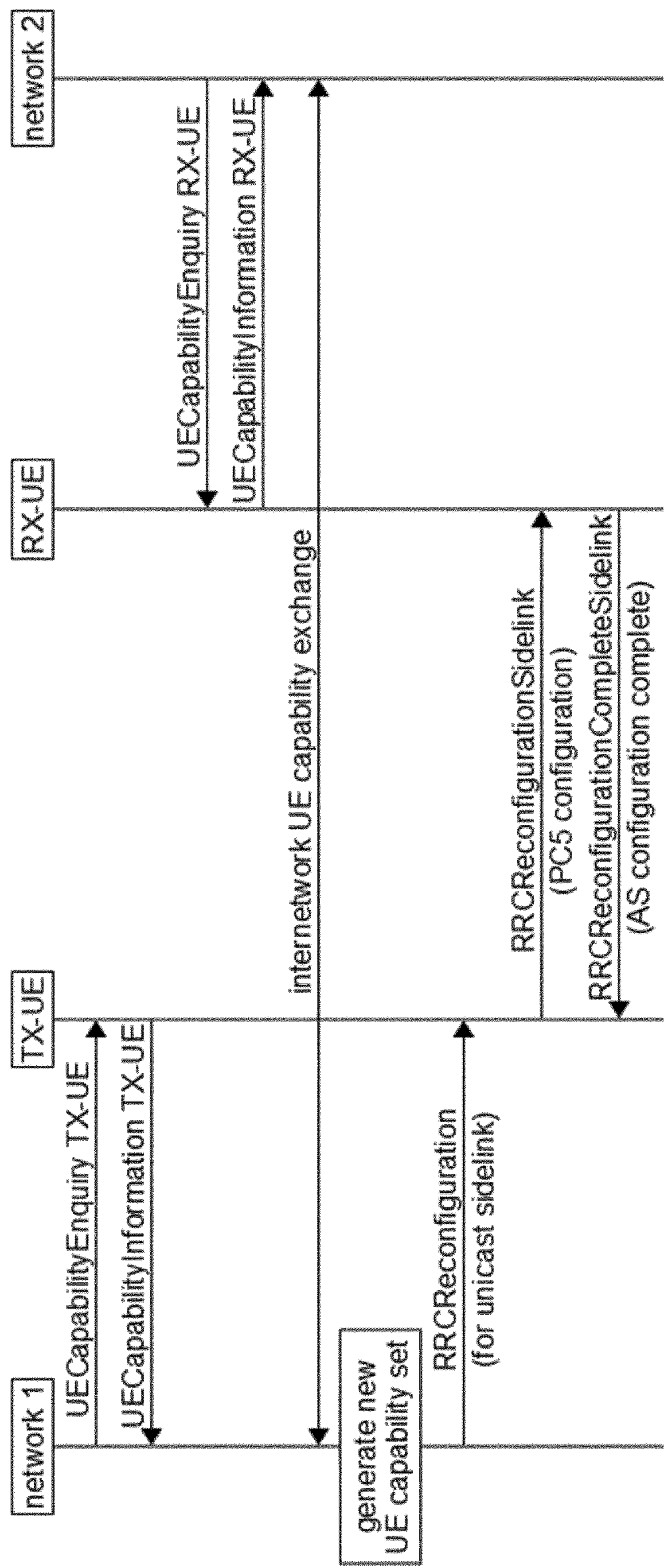
FIG. 20 shows a schematic diagram of an example of a system environment with signaling variants according to exemplary embodiments of the present invention.

FIG. 20 illustrates a signal flow for a case in which no new logical component ("PC5-DB"/"PC5 data set") is provided and the capability information of both the TX UE and the RX UE is enquired from the respective UE (the RX UE's capability information is exchanged via an inter network UE capability exchange involving the network serving the RX UE). This signaling flow is also applicable for the case the capability information of both the TX UE and the RX UE cannot be retrieved from the new logical component(s) ("PC5-DB"/"PC5 data set") or the capability information of both the TX UE and the RX UE at the new logical component(s) ("PC5-DB"/"PC5 data set") is invalid.

Figure 14:
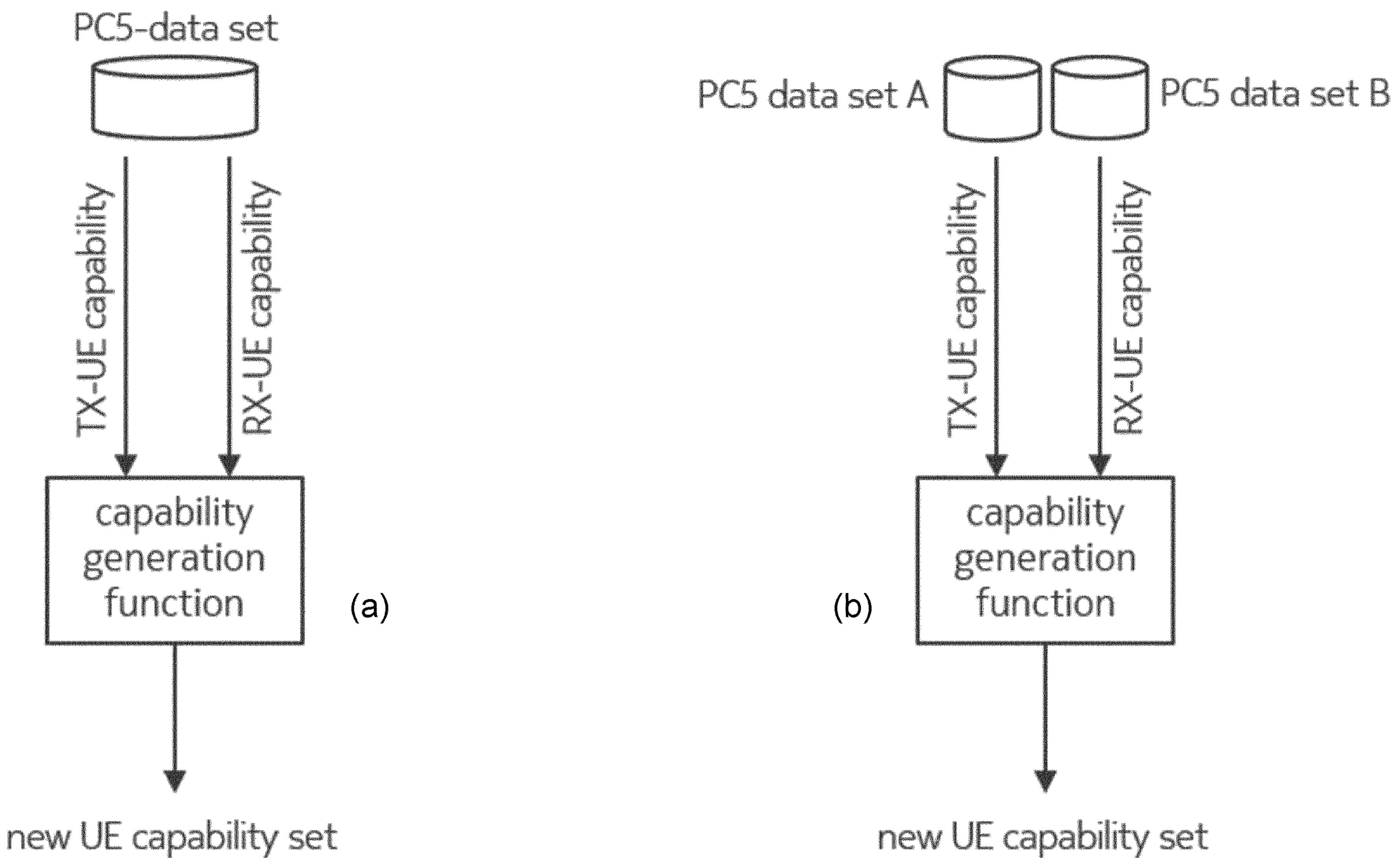
FIG. 14 is a schematic diagram of procedures according to exemplary embodiments of the present invention.

Further, FIG. 14 is a schematic diagram of procedures according to exemplary embodiments of the present invention. In particular, FIG. 14 illustrates the formation of a new UE capability set, if the UE capabilities of both the TX UE and the RX UE are stored in a same new logical component ("PC5-DB"/"PC5 data set") or different new logical components ("PC5-DB"/"PC5 data set").

When the initiating UE (TX UE) in RRC CONNECTED state requests to its gNB to establish a PC5 unicast sidelink connection with its peer UE (RX UE), firstly, the network requests the UE capability from the new logical component ("PC5-DB"/"PC5 data set") for both, the initiating UE (TX UE) and peer UE (RX UE) based on UE identifiers (subscription permanent identifier (SUPI), international mobile subscriber identity (IMSI)), see FIGS. 13 and 15.

If the new logical component ("PC5-DB"/"PC5 data set") of one or both of the UEs is in another 5G network (PLMN), the visiting network can request the UE capability data from the home network located logical component ("PC5-DB"/"PC5 data set") via N32/roaming architecture, see FIG. 16.

If the new logical component ("PC5-DB"/"PC5 data set") does not contain UE capability of at least one of the UEs, the network requests the UE capability from the missing UE by sending a UE capability enquiry message, see FIGS. 17, 18 and 19. According to exemplary embodiments of the present invention, the condition for retrieving new UE capability data may be that UE capability data is not existing, UE capability is existing in the database but it is outdated, or UE capability data is existing in the database but the UE has (re)registered to a network/PLMN. In other words, according to exemplary embodiments, nonexistence it not the only condition, but invalidity or expiry of UE capability information may be considered. Here, it is further noted that such requesting the UE capability from the UE(s) may be effected also without involving such a new logical component ("PC5-DB"/"PC5 data set") at all, e.g. in case such new logical component ("PC5-DB"/"PC5 data set") is not provided but instead it is relied upon a signaling only approach or a mixed approach (new logical component ("PC5-DB"/"PC5 data set") or requesting/signaling dependent on the situation).

Once the UE has responded by sending the UE capability information message over Uu the network may store the data in the new logical component ("PC5-DB"/"PC5 data set") and make it accessible.

The network of the initiating UE (TX UE) constructs a new set of UE capability for the unicast sidelink that both UEs (TX UE and RX UE) can comply with. Hence, the newly formed UE capability set will be a minimum set that avoids an AS configuration failure. FIG. 14 illustrates the formation of a new UE capability set, if the UE capabilities of both the TX UE and the RX UE are stored in (a) a same new logical component ("PC5-DB"/"PC5 data set") or (b) different new logical components ("PC5-DB"/"PC5 data set"). The principles illustrated in FIG. 14 are also applicable to cases where the respective capability information is received via signaling e.g. from the TX UE (FIG. 14 (*a*)) or from the TX UE and the RX UE (FIG. 14 (*b*)).

According to exemplary embodiments of the present invention, the capability generation function will select/create the corresponding feature group/set (index group in chapter 15 of 3GPP RAN1 "R1-1911751: RAN1 UE features list for Rel-16 NR").

With respect to the creation of the feature set, it is noted that if e.g. a particular feature has Boolean character, the network may set "TRUE" to a feature entry only if both UE support that feature, otherwise it will set "FALSE". On the other hand, if a feature is a sequence or integer character, the network might create a new value. As an example, if TX UE supports a feature value "rank4", and the RX UE supports a feature value "rank2", the network may create a new value dictating "rank 1" (which is not a cutset of "rank 4" and "rank 2"). The constraint when creating the new UE capability set (intersection set) is that it is complied with by both UEs.

The table below illustrates an exemplary result of the new UE capability set (intersection set). In the table below, items "15-1 1)", "15-1 2)", "15-1 3)", "15-2 1)", "15-3 1)", "15-4 1)", "15-5 1)", and "15-5 2)" are mandatory UE capability features for sidelink, i.e. these features need to be supported by both UEs in order to support sidelink at all.

| Index | Feature group | UE capability | UE 1 | UE 2 | new UE capability |
|---|---|---|---|---|---|
| 15-1 | Receiving NR sidelink mode 1 and 2 | 1) UE can receive PSCCH/PSSCH transmitted using NR sidelink mode 1 and 2. 2) UE can receive [X] PSCCH in a slot. 3) UE can decode [Y] RBs per slot counting both PSCCH and PSSCH. 4) UE supports normal 64QAM MCS table and 256QAM MCS table. | 1)True 2)True 3)True 4)True | 1)True 2)True 3)True 4)False | 1)True 2)True 3)True 4)False |
| 15-2 | Transmitting NR sidelink mode 1 scheduled by NR Uu | 1) UE can transmit PSCCH/PSSCH using dynamic scheduling and configured grant type 1 and 2 in NR sidelink mode 1 scheduled by NR Uu. 2) UE supports normal 64QAM MCS table and 256QAM MCS table. | 1)True 2)True | 1)True 2)False | 1)True 2)False |
| 15-3 | Transmitting NR sidelink mode 2 configured by NR Uu | 1) UE can transmit PSCCH/PSSCH using NR sidelink mode 2 configured by NR Uu and preconfiguration. 2) UE supports normal 64QAM MCS table and 256QAM MCS table. | 1)True 2)True | 1)True 2)False | 1)True 2)False |
| 15-4 | S-SSB for NR sidelink mode 1 and 2 | 1) UE can transmit and receive S-SSB in NR sidelink mode 1 and 2 | 1)True | 1)True | 1)True |
| 15-5 | Sidelink congestion control | 1) UE can report CBR measurement to gNB. 2) UE can adjust its radio parameters based on CBR measurement. | 1)True 2)True | 1)True 2)True | 1)True 2)True |
| 15-6 | Short-term time-scale TDM for in-device coexistence | 1) Support prioritization between LTE sidelink transmission/reception and NR sidelink transmission/reception | 1)True | 1)False | 1)False |
| 15-7 | Transmitting LTE sidelink mode 3 scheduled by NR Uu | 1) UE can transmit PSCCH/PSSCH using SPS in LTE sidelink mode 3 scheduled by NR Uu. | 1)True | 1) False | 1)False |
| 15-8 | UE inter-RAT sidelink control processing capability | 1) UE reports a value 'X' for the minimum value it supports for the additional time indicated in the NR DCI scheduling LTE sidelink mode 3. | 1)True | 1)False | 1)False |
| 15-9 | Transmitting LTE sidelink mode 4 configured by NR Uu | 1) UE can transmit PSCCH/PSSCH using LTE sidelink mode 4 configured by NR Uu and preconfiguration. | 1)True | 1)False | 1)False |
| 15-10 | 256QAM sidelink transmission | 1) UE can transmit PSSCH with 256QAM in NR sidelink | 1)True | 1)False | 1)False |
| 15-11 | [PSFCH] | [1) UE can transmit and receive PSFCH in NR sidelink mode 1 and 2.] | 1)True | 1)False | 1)False |
| 15-12 | Low-spectral efficiency 64QAM MCS table | 1) UE additionally supports low-spectral efficiency 64QAM MCS table. | 1)True | 1)False | 1) False |
| 15-13 | [PT-RS] | [1) UE supports NR sidelink transmission or reception using PT-RS.] | 1)True | 1)False | 1)False |

Once the UE capability set (minimum set, intersection set) is formed/generated/created, the network sends a unicast PC5 configuration (based on this formed/generated/created UE capability set (minimum set, intersection set)) in a RRCReconfiguration message to the initiating UE (TX UE), see FIGS. 13, 15 to 20.

Subsequently, the initiating UE (TX UE) sends the PC5 configuration to its peer UE (RX UE) over PC5, see FIGS. 13, 15 to 20.

Finally, the peer UE (RX UE) feedbacks an AS configuration complete message, see FIGS. 13, 15 to 20.

Hence, exemplary embodiments of the present invention avoid AS configuration failure in unicast sidelink with different UE capabilities of TX-UE and RX-UE. Consequently, feeding back an AS configuration failure does not occur any more.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 21:
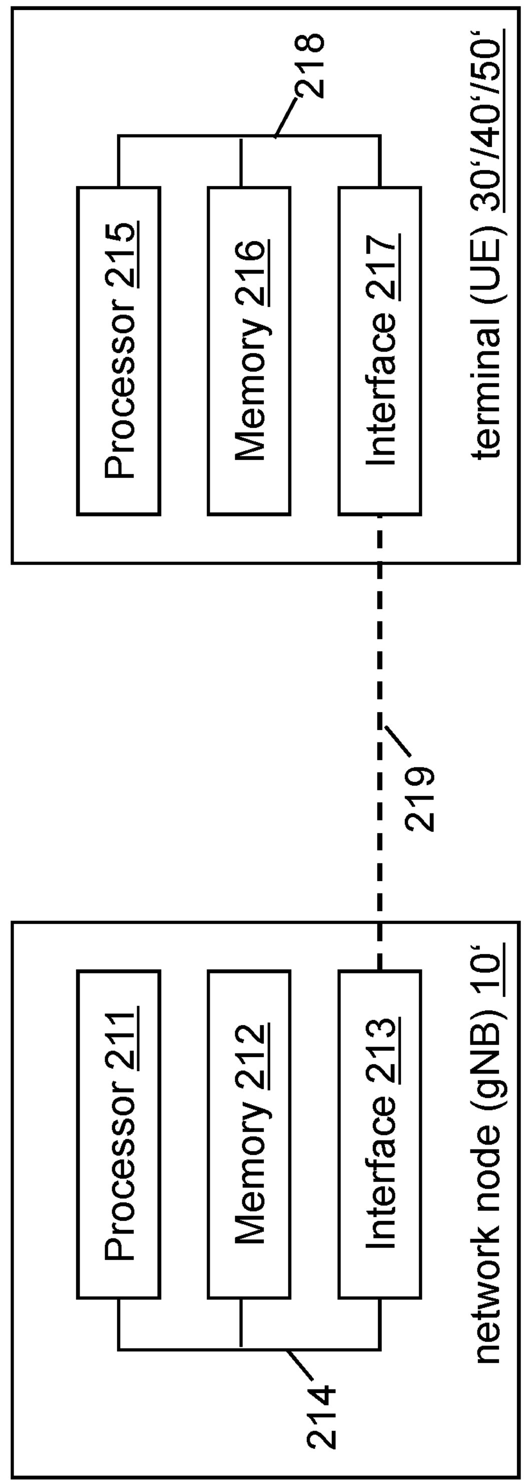
FIG. 21 is a block diagram alternatively illustrating apparatuses according to exemplary embodiments of the present invention.

In FIG. 21, an alternative illustration of apparatuses according to exemplary embodiments of the present invention is depicted. As indicated in FIG. 21, according to exemplary embodiments of the present invention, the apparatus (network node) 10' (corresponding to the network node 10) comprises a processor 211, a memory 212 and an interface 213, which are connected by a bus 214 or the like. Further, according to exemplary embodiments of the present invention, the apparatus (terminal) 30'/40'/50' (being a first terminal attempting a sidelink connection between said first terminal and a second terminal) (corresponding to the terminal 30/40/50) comprises a processor 215, a memory 216 and an interface 217, which are connected by a bus 218 or the like, and the apparatuses may be connected via link 219, respectively.

The processor 211/215 and/or the interface 213/217 may also include a modem or the like to facilitate communication over a (hardwire or wireless) link, respectively. The interface 213/217 may include a suitable transceiver coupled to one or more antennas or communication means for (hardwire or wireless) communications with the linked or connected device(s), respectively. The interface 213/217 is generally configured to communicate with at least one other apparatus, i.e. the interface thereof.

The memory 212/216 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10 comprises at least one processor 211, at least one memory 212 including computer program code, and at least one interface 213 configured for communication with at least another apparatus. The processor (i.e. the at least one processor 211, with the at least one memory 212 and the computer program code) is configured to perform receiving, from a first terminal, a request for a sidelink connection between said first terminal and a second terminal (thus the apparatus comprising corresponding means for receiving), to perform obtaining first sidelink related terminal capabilities of said first terminal and second sidelink related terminal capabilities of said second terminal (thus the apparatus comprising corresponding means for obtaining), to perform generating an intersection set of said first sidelink related terminal capabilities and said second sidelink related terminal capabilities (thus the apparatus comprising corresponding means for generating), and to perform setting a configuration for said sidelink connection based on said intersection set (thus the apparatus comprising corresponding means for setting).

According to further exemplary embodiments of the present invention, an apparatus representing the terminal 30 (being a first terminal attempting a sidelink connection between said first terminal and a second terminal) comprises at least one processor 215, at least one memory 216 including computer program code, and at least one interface 217 configured for communication with at least another apparatus. The processor (i.e. the at least one processor 215, with the at least one memory 216 and the computer program code) is configured to perform receiving, from a network node serving said first terminal, an enquiry for first sidelink related terminal capabilities of said first terminal (thus the apparatus comprising corresponding means for receiving), and to perform transmitting said first sidelink related terminal capabilities to said network node (thus the apparatus comprising corresponding means for transmitting).

According to further exemplary embodiments of the present invention, an apparatus representing the terminal 40 (being a first terminal attempting a sidelink connection between said first terminal and a second terminal) comprises at least one processor 215, at least one memory 216 including computer program code, and at least one interface 217 configured for communication with at least another apparatus. The processor (i.e. the at least one processor 215, with the at least one memory 216 and the computer program code) is configured to perform receiving, from a network node serving said first terminal, an enquiry for second sidelink related terminal capabilities of said second terminal (thus the apparatus comprising corresponding means for receiving), to perform enquiring, from said second terminal, said second sidelink related terminal capabilities (thus the apparatus comprising corresponding means for enquiring), to perform receiving said second sidelink related terminal capabilities from said second terminal, and to perform transmitting said second sidelink related terminal capabilities to said network node (thus the apparatus comprising corresponding means for transmitting).

According to further exemplary embodiments of the present invention, an apparatus representing the terminal 50 (being a first terminal attempting a sidelink connection between said first terminal and a second terminal) comprises at least one processor 215, at least one memory 216 including computer program code, and at least one interface 217 configured for communication with at least another apparatus. The processor (i.e. the at least one processor 215, with the at least one memory 216 and the computer program code) is configured to perform receiving, from a network node serving said first terminal, an enquiry for first sidelink related terminal capabilities of said first terminal and second sidelink related terminal capabilities of said second terminal (thus the apparatus comprising corresponding means for receiving), to perform enquiring, from said second terminal, said second sidelink related terminal capabilities (thus the apparatus comprising corresponding means for enquiring), to perform receiving said second sidelink related terminal capabilities from said second terminal, and to perform transmitting said first sidelink related terminal capabilities and said second sidelink related terminal capabilities to said network node (thus the apparatus comprising corresponding means for transmitting).

For further details regarding the operability/functionality of the individual apparatuses, reference is made to the above description in connection with any one of FIGS. 1 to 9 and 11 to 20, respectively.

For the purpose of the present invention as described herein above, it should be noted that

- method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;
- an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for improvement of sidelink connection establishment assistance. Such measures exemplarily comprise receiving, from a first terminal, a request for a sidelink connection between said first terminal and a second terminal, obtaining first sidelink related terminal capabilities of said first terminal and second sidelink related terminal capabilities of said second terminal, generating an intersection set of said first sidelink related terminal capabilities and said second sidelink related terminal capabilities, and setting a configuration for said sidelink connection based on said intersection set.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

List of Acronyms and Abbreviations

3GPP Third Generation Partnership Project
AMF access and mobility management function
API application programming interface
AS Access Stratum
CBR channel busy ratio
D2D device-to-device
EPC evolved packet core
hPLMN home public land mobile network
HSS home subscriber server
H-PLMN home public land mobile network
IMSI international mobile subscriber identity
LTE-SL long term evolution sidelink
NR new radio
NW network
PC5 radio interface for D2D communication
PC5-DB PC5 UE capability data-base
PCF policy control function
PLMN public land mobile network
RAN radio access network
RCU remote control unit
RRC radio resource control
RRH remote radio head
RX receiving
RX UE receiving UE, peer UE
SEPP security edge protection proxy
SLRB sidelink radio bearer
SUPI subscription permanent identifier
TX transmitting
TX UE transmitting UE, initiating UE
UDM unified data management
UDR unified data repository
UE user equipment
V2X CF vehicle-to-X control function
vPLMN visiting public land mobile network
V-PLMN visiting public land mobile network

The invention claimed is:

1. An apparatus comprising: receiving circuitry configured to receive, from a first terminal, a request for a sidelink connection between said first terminal and a second terminal, obtaining circuitry configured to obtain first sidelink related terminal capabilities of said first terminal and second sidelink related terminal capabilities of said second terminal, generating circuitry configured to generate an intersection set of said first sidelink related terminal capabilities and said second sidelink related terminal capabilities, wherein the intersection set comprises a set of capabilities that is complied with by both the first terminal and the second terminal, setting circuitry configured to set a configuration for said sidelink connection based on said intersection set, retrieving circuitry configured to retrieve said first sidelink related terminal capabilities from a first data set, and enquiring circuitry configured to enquire, if said retrieving said first sidelink related terminal capabilities from said first data set is unsuccessful, from said first terminal, said first sidelink related terminal capabilities.

2. The apparatus according to claim 1, further comprising: retrieving circuitry configured to retrieve said second sidelink related terminal capabilities from said first data set.

3. The apparatus according to claim 1, further comprising: retrieving circuitry configured to retrieve said second sidelink related terminal capabilities from a second data set different from said first data set.

4. The apparatus according to claim 1, further comprising: further comprising: enquiring circuitry configured to enquire, if said first sidelink related terminal capabilities retrieved from said first data set is invalid, from said first terminal, said first sidelink related terminal capabilities.

5. The apparatus according to claim 2, further comprising: enquiring circuitry configured to enquire, if said retrieving said second sidelink related terminal capabilities from said first data set is unsuccessful, from said second terminal, said second sidelink related terminal capabilities.

6. The apparatus according to claim 2, further comprising: enquiring circuitry configured to enquire, if said second sidelink related terminal capabilities retrieved from said first data set is invalid, from said second terminal, said second sidelink related terminal capabilities.

7. The apparatus according to claim 2, further comprising: enquiring circuitry configured to enquire, if said retrieving said second sidelink related terminal capabilities from said first data set is unsuccessful, from said first terminal, said second sidelink related terminal capabilities.

8. The apparatus according to claim 2, further comprising: enquiring circuitry configured to enquire, if said second sidelink related terminal capabilities retrieved from said first data set is invalid, from said first terminal, said second sidelink related terminal capabilities.

9. The apparatus according to claim 2, further comprising: enquiring circuitry configured to enquire, if said retrieving said first sidelink related terminal capabilities from said first data set is unsuccessful and said retrieving said second sidelink related terminal capabilities from said first data set is unsuccessful, from said first terminal, said first sidelink related terminal capabilities and said second sidelink related terminal capabilities.

10. The apparatus according to claim 2, further comprising:

enquiring circuitry configured to enquire, if said first sidelink related terminal capabilities retrieved from said first data set is invalid and said second sidelink related terminal capabilities retrieved from said first data set is invalid, from said first terminal, said first sidelink related terminal capabilities and said second sidelink related terminal capabilities.

11. The apparatus according to claim 3, further comprising:

demanding circuitry configured to demand, if said retrieving said second sidelink related terminal capabilities from said second data set is unsuccessful, to enquire, from said second terminal, said second sidelink related terminal capabilities.

12. The apparatus according to claim 3, further comprising:

demanding circuitry configured to demand, if said second sidelink related terminal capabilities retrieved from said second data set is invalid, to enquire, from said second terminal, said second sidelink related terminal capabilities.

13. The apparatus according to claim 1, further comprising:

enquiring circuitry configured to enquire, from said first terminal, said first sidelink related terminal capabilities.

14. The apparatus according to claim 1, further comprising:

enquiring circuitry configured to enquire, from said second terminal, said second sidelink related terminal capabilities.

15. A method comprising:

receiving, from a first terminal, a request for a sidelink connection between said first terminal and a second terminal, obtaining first sidelink related terminal capabilities of said first terminal and second sidelink related terminal capabilities of said second terminal, generating an intersection set of said first sidelink related terminal capabilities and said second sidelink related terminal capabilities, wherein the intersection set comprises a set of capabilities that is complied with by both the first terminal and the second terminal, setting a configuration for said sidelink connection based on said intersection set, retrieving said first sidelink related terminal capabilities from a first data set, and enquiring, if said retrieving said first sidelink related terminal capabilities from said first data set is unsuccessful, from said first terminal, said first sidelink related terminal capabilities.

* * * * *